(12) United States Patent
Simpson

(10) Patent No.: US 9,722,767 B2
(45) Date of Patent: Aug. 1, 2017

(54) CLOCK DOMAIN BRIDGE STATIC TIMING ANALYSIS

(71) Applicant: Microsoft Technology Licensing, LLC, Redmond, WA (US)

(72) Inventor: Miles Simpson, Belmont, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/749,905

(22) Filed: Jun. 25, 2015

(65) Prior Publication Data

US 2016/0380748 A1    Dec. 29, 2016

(51) Int. Cl.
| | |
|---|---|
| H04L 7/02 | (2006.01) |
| H04L 7/00 | (2006.01) |
| H04L 12/40 | (2006.01) |
| G06F 5/06 | (2006.01) |
| G06F 1/04 | (2006.01) |

(52) U.S. Cl.
CPC .............. *H04L 7/0008* (2013.01); *G06F 1/04* (2013.01); *G06F 5/06* (2013.01); *H04L 7/0012* (2013.01); *H04L 12/40* (2013.01); *H04L 7/005* (2013.01)

(58) Field of Classification Search
CPC ............................. H04L 7/0008; H04L 12/40
USPC .................. 375/224; 370/438; 455/456.6
See application file for complete search history.

(56) References Cited

U.S. PATENT DOCUMENTS

| | | |
|---|---|---|
| 6,813,674 B1 | 11/2004 | Velasco et al. |
| 8,225,259 B1 | 7/2012 | Mendel et al. |
| 8,572,532 B1 | 10/2013 | Singh et al. |
| 8,572,539 B2 | 10/2013 | Cortadella et al. |
| 8,826,058 B1 | 9/2014 | Cox, Jr. et al. |
| 2015/0347652 A1* | 12/2015 | DiLullo .............. G06F 17/5031 716/136 |
| 2016/0035409 A1* | 2/2016 | Gopalan ............. G11C 11/4076 365/193 |

OTHER PUBLICATIONS

"Clock Domain Crossing: Closing the Loop on Clock Domain Functional Implementation Problems", Technical Paper, Cadence Design Systems, Available at http://www.gstitt.ece.ufl.edu/courses/eel4712/lectures/metastability/cdc_wp.pdf, Dec. 2004, San Jose, California, 15 pages.

* cited by examiner

*Primary Examiner* — Wednel Cadeau

(74) *Attorney, Agent, or Firm* — Alleman Hall Creasman & Tuttle LLP

(57) ABSTRACT

Examples for performing static timing analysis on clocked circuits are described. An example static timing analysis computing device includes a logic device, and a storage device holding instructions executable by the logic device, the instructions including instructions executable to receive an input representative of one or more delays within a signal path in a cross-domain circuit, the cross-domain circuit configured to transfer data between a first domain having a first clock and a second domain having a second clock asynchronous with the first clock, receive an input representative of a static timing analysis constraint to be met by a signal traveling the signal path in the cross-domain circuit, apply the constraint in a static timing analysis of the signal path in the cross-domain circuit, and output a result based upon applying the static timing analysis constraint.

18 Claims, 25 Drawing Sheets

CLOCK DOMAIN BRIDGE STATIC TIMING ANALYSIS

BACKGROUND

Circuits may include components that operate based on clock signal inputs. Cross-domain circuits include components that are clocked by different, possibly asynchronous clocks.

SUMMARY

Examples for performing static timing analysis on circuits that cross clock domains are described. In one example, a static timing analysis computing device includes a logic device, and a storage device holding instructions executable by the logic device. The instructions include those which are executable to receive an input representative of one or more delays within a signal path in a cross-domain circuit, the cross-domain circuit configured to transfer data between a first domain having a first clock and a second domain having a second clock asynchronous with the first clock, receive an input representative of a static timing analysis constraint to be met by a signal traveling the signal path in the cross-domain circuit, apply the constraint in a static timing analysis of the signal path in the cross-domain circuit, and output a result based upon applying the static timing analysis constraint.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, digital integrated circuits often operate in multiple clock domains which can be asynchronous to one another. Data may "bridge" clock domains, or be transferred from one to another. However, doing so creates timing paths between the domains. Two path groups can exist—one path group synchronizing control logic which tracks transfers across the clock boundary, and another path group transferring the actual content or data words themselves. These paths are not easily constrained since Electronic Design Automation (EDA) synthesis and physical design tools are often developed to work with synchronous logic. The above-referenced tools thus analyze paths within clock domains or between domains whose frequencies are related, and not paths between asynchronous clock domains.

A wide variety of bridge designs may be commonly used industry wide to implement clock-domain bridging. Differing designs have different static timing characteristics. The lack of a standard approach makes it difficult for EDA tool venders to develop standard solutions for static timing analysis (STA). As a result, STA tools may fall short of the mark when it comes to analyzing paths between clock domains whose frequencies are asynchronous to each other. Analysis therefore is often performed manually using rules of thumb derived from assumptions which may only be partially correct.

The disclosed examples provide a more comprehensive approach for analysis of cross-clock-domain timing paths. Different categories of clock-domain bridging are presented, and constraints for STA are derived for each them. Tools applying these constraints may be used in the synthesis and physical design phases of IC development to ensure the bridges meet timing and will not fail in the final product.

Figure 1:
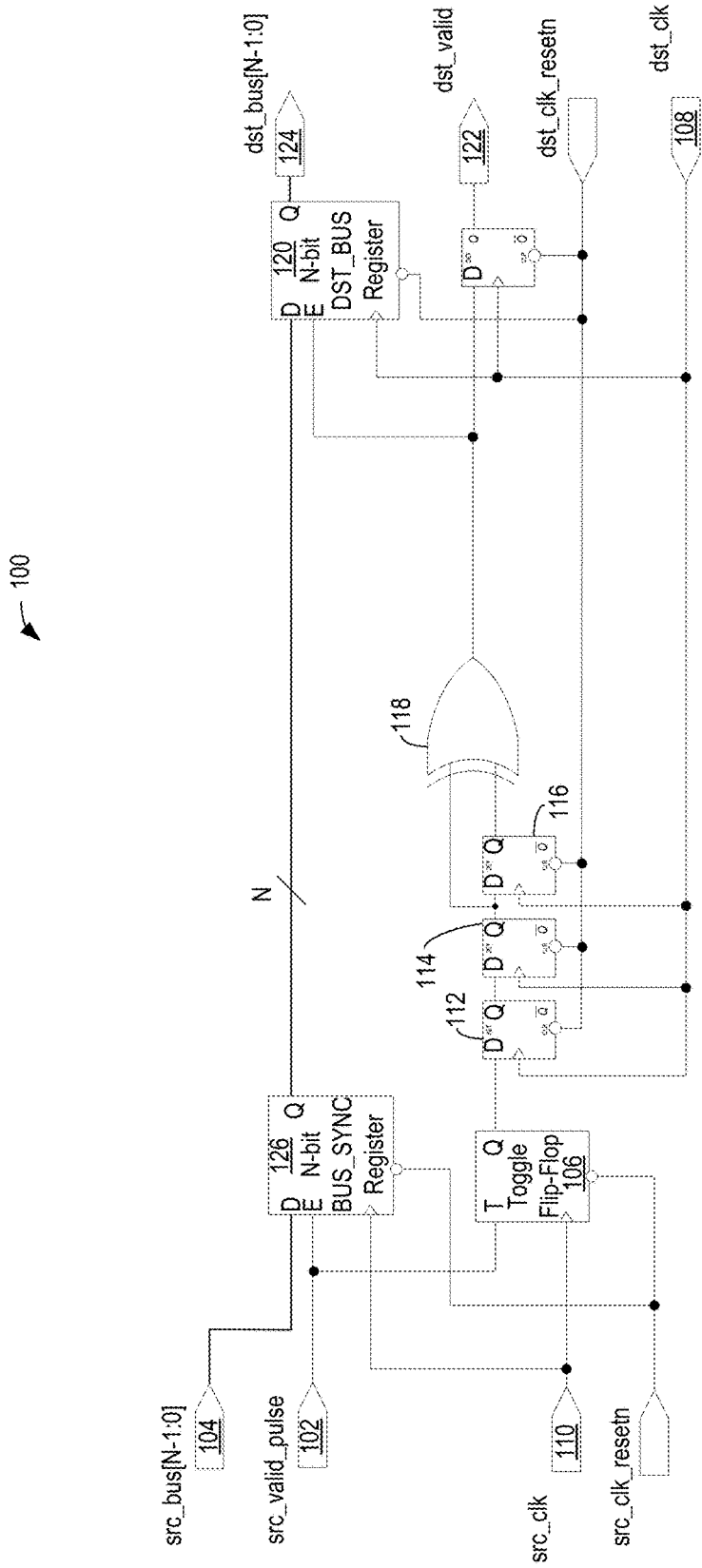
FIG. 1 shows an example of a one-way, two-flop data bus bridge circuit.

FIG. 1 shows a diagram of an example one-way, two-flop data bus bridge 100. In an example signal path of the one-way, two-flop synchronization bridge 100, a src_valid_pulse signal 102 pulses high for one cycle to indicate that new data is presented on a source bus, src_bus 104. The src_valid_pulse (e.g., an asserted high pulse on src_valid_pulse) signals (e.g., via input "T") Toggle Flip-Flop 106 to toggle its output (e.g., output "Q"). A single data word to the dst_clk domain (e.g., components clocked by dst_clk 108) is transferred responsive to a single toggle of the Toggle Flip-Flop 106. This toggle edge, synchronous to src_clk 110, is then synchronized to the dst_clk domain using two flip flops, 112 and 114, cascaded together. A third flip-flop 116 tracks the previous value in order to perform an edge detect. An XOR gate 118 pulses high for one cycle when it detects a toggle (e.g., a change in a signal input to the XOR gate). Data is captured in a DST_BUS register 120, then dst_valid 122 pulses high to indicated valid data on dst_bus 124.

An upstream device which drives src_valid_pulse 102 and src_bus 104 may operate in an effective manner when data is transmitted at a low enough rate for the each word to pass from a BUS_SYNC register 126 to the DST_BUS register 120 without the BUS_SYNC register 126 being overwritten before the transfer is complete. The src_valid_pulse signal 102 may go high for 1 cycle, then go low for some number of cycles. This number (e.g., the number of cycles at which the src_valid_pulse signal is low) depends on the frequency of dst_clk 108 and inter-domain delay paths. Too few low cycles may result in the loss of data as the BUS_SYNC register 126 shifts in new data before the previous data has had a chance to be captured by the DST_BUS register 120.

Figure 2:
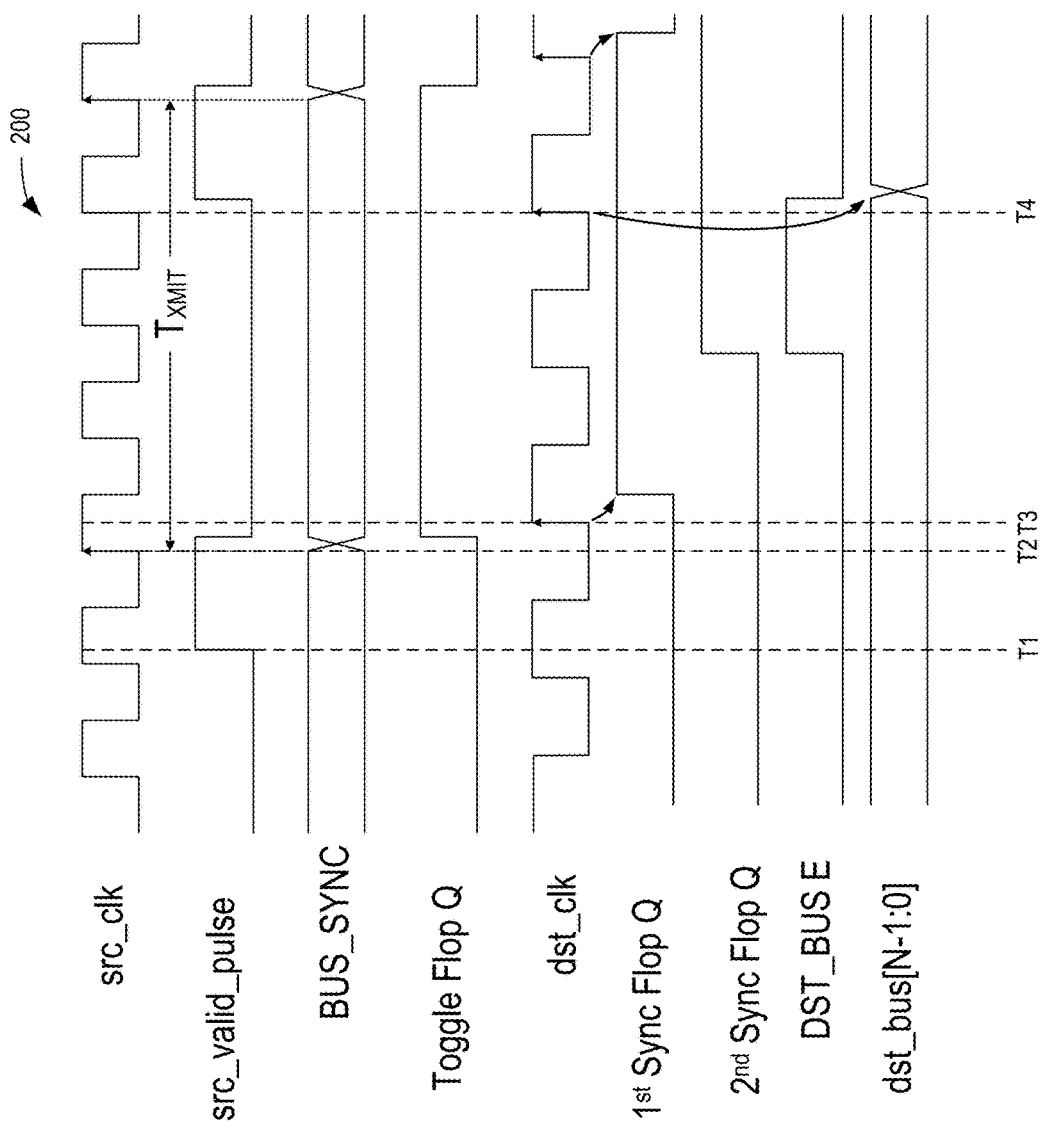
FIG. 2 shows an example transmit timing diagram for the circuit of FIG. 1.

FIG. 2 shows a timing diagram 200 indicating the timing on src_valid_pulse 102 of FIG. 1, and illustrates successive pulses that are to be separated by a minimum interval ($T_{XMIT}$) to allow time for synchronization of the toggle signal and the transfer of data from a source register (e.g., BUS_SYNC register 126 of FIG. 1) to a destination register (e.g., DST_BUS register 120 of FIG. 1). Each signal illustrated in timing diagram 200 corresponds to a signal output from a corresponding component of bridge 100 of FIG. 1 (e.g., the component having a corresponding name in FIG. 1) over a duration of time. As illustrated in FIG. 2, src_clk 110 pulses high at regular intervals to control timing of events at connected components. Similarly, dst_clk 108 pulses high at regular intervals to control timing of events at connected components. However, dst_clk and src_clk are asynchronous from one another, as is evident from the difference in pulse width and timing of rising edges.

Src_valid_pulse 102, which may be indicative of an originating event triggering a transfer of data from a source register to a destination register, pulses high at time T1. Data is presented on src_bus[N−1:0] at the same time or prior to T1, and is held valid up to and just beyond the first rising edge of src_clk which follows the BUS_SYNC register to sample that data. In this way, data is shifted from an external source into the BUS_SYNC register. The first rising edge of src_clk after the rising edge of src_valid_pulse occurs at time T2, which triggers the BUS_SYNC register 126 to transmit stored data to DST_BUS register 120 and Toggle Flip-Flop 106 to toggle its output. Each of these events may occur after a small delay corresponding to component and routing delays in the circuit.

Due to the delays in the circuit and the asynchronous clocks 110 and 108, if the DST_BUS register 120 passed its data to dst_bus 124 responsive to the first rising edge of dst_clk 108 after the src_valid_pulse is toggled high (e.g., at time T3), the captured data may not represent the data that was transmitted by BUS_SYNC register 126 at time T2. Accordingly, the dst_clk rising edge at time T3 triggers the cascaded synchronization flip-flops 112 and 114 to propagate the toggled signal from Toggle Flip-Flop 106 to XOR gate 118, which controls the enable input on DST_BUS register 120. The first rising edge of dst_clk 108 after the DST_BUS register 120 is enabled (e.g., at time T4) triggers the sampling of the data pattern on the D input of the DST_BUS register 120 (e.g., the data transmitted from BUS_SYNC register 126) and the transfer of this sampled value to its Q output which drives the dst_bus signal 124. After this transfer, the data pattern driven on dst_bus is held constant until the next rising edge of dst_clk.

Figure 3:
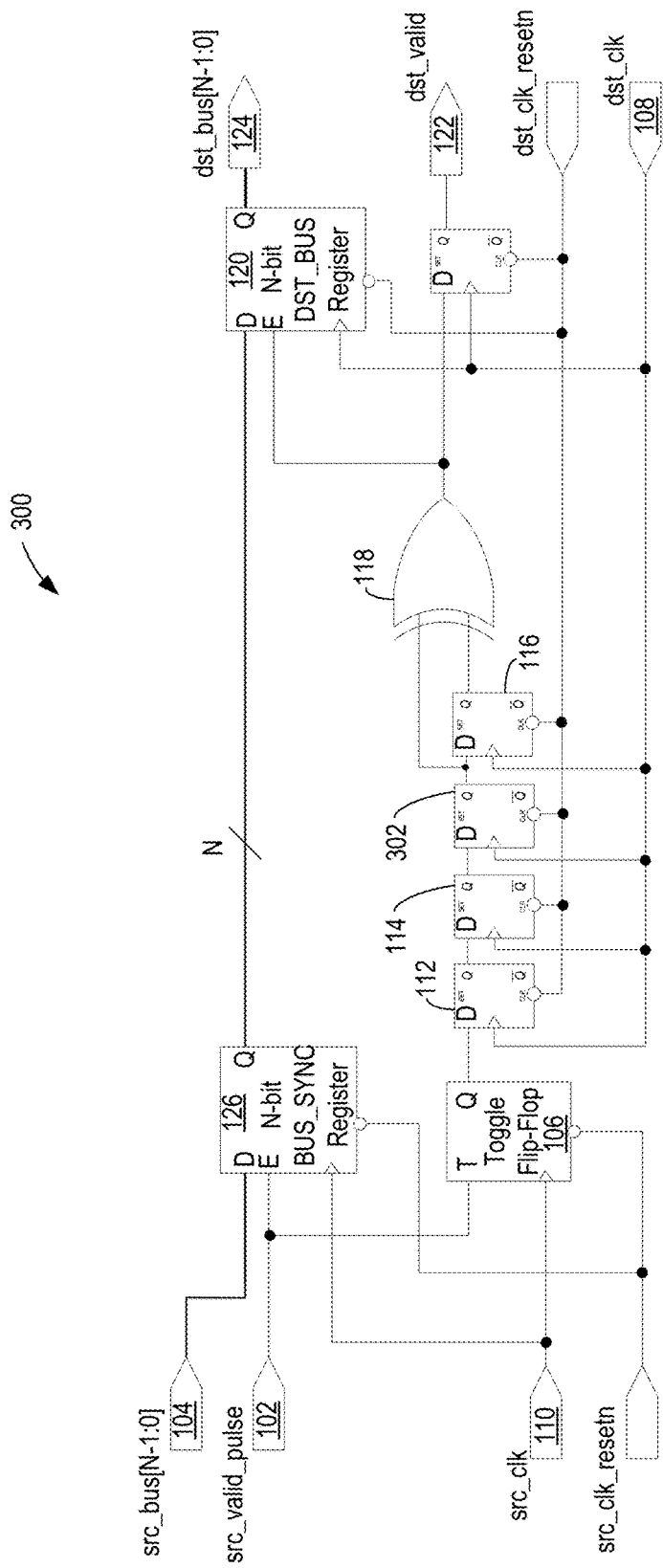
FIG. 3 shows an example of a one-way, three-flop, data bus bridge circuit.

A variation on the one-way data bus bridge of FIG. 1 is shown in FIG. 3. An extra (e.g., third) synchronization flip-flop 302 is added to the chain of flops clocked by dst_clk 108 that follows the Toggle Flip-Flop 106 to provide a three-flop synchronization bridge 300. This provides more settle time for the inter-domain timing path that exists between the BUS_SYNC register 126 and the DST_BUS register 120. At the same time the added synchronization flip-flop 302 reduces the throughput rate of the bridge. The third synchronization flip-flop 302 adds another dst_clk cycle to the pulse separation timing marked as $T_{XMIT}$ in FIG. 2.

Figure 4:
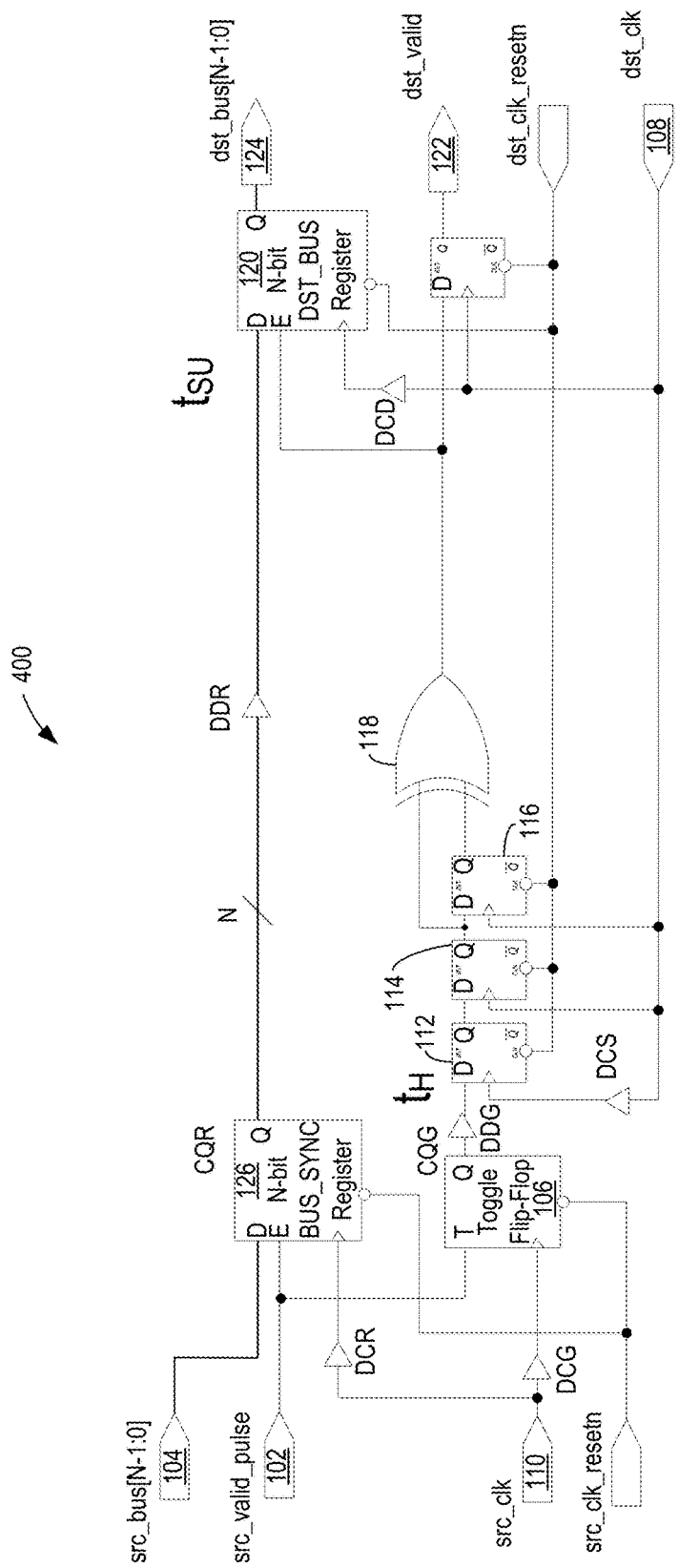
FIG. 4 shows an example of a one-way data bus bridge with buffers representing post-layout delays in the circuit.

FIG. 4 shows the same bridge from FIG. 1 with buffers added and parameters for delays annotated throughout the diagram to represent post-layout timing. The parameters for delays are defined in Table 1:

TABLE 1

| Parameter | Description |
| --- | --- |
| DCR | Clock insertion delay to the BUS_SYNC register |
| CQR | Clock-to-Q (output) delay of all the flops in the BUS_SYNC register |
| DDR | Path which includes routing delay from the BUS_SYNC Register to the DST_BUS Register, but that does not include setup time |
| DCG | Clock insertion delay to the Toggle Flip-Flop |
| CQG | Clock-to-Q (output) delay of the Toggle Flip-Flop |
| DDG | Routing delay from the Toggle Flip-Flop to the first synchronization flop |
| DCD | Clock insertion delay to the flops in the DST_BUS register |
| DCS | Clock insertion delay to the first synchronization flop |
| $t_{SU}$ | Flip-flop setup time of the flops in the DST_BUS register |
| $t_H$ | Flip-flop hold time of the first synchronization flop |
| $T_{DCYC}$ | Cycle time of the dst_clk clock |

Figure 5:
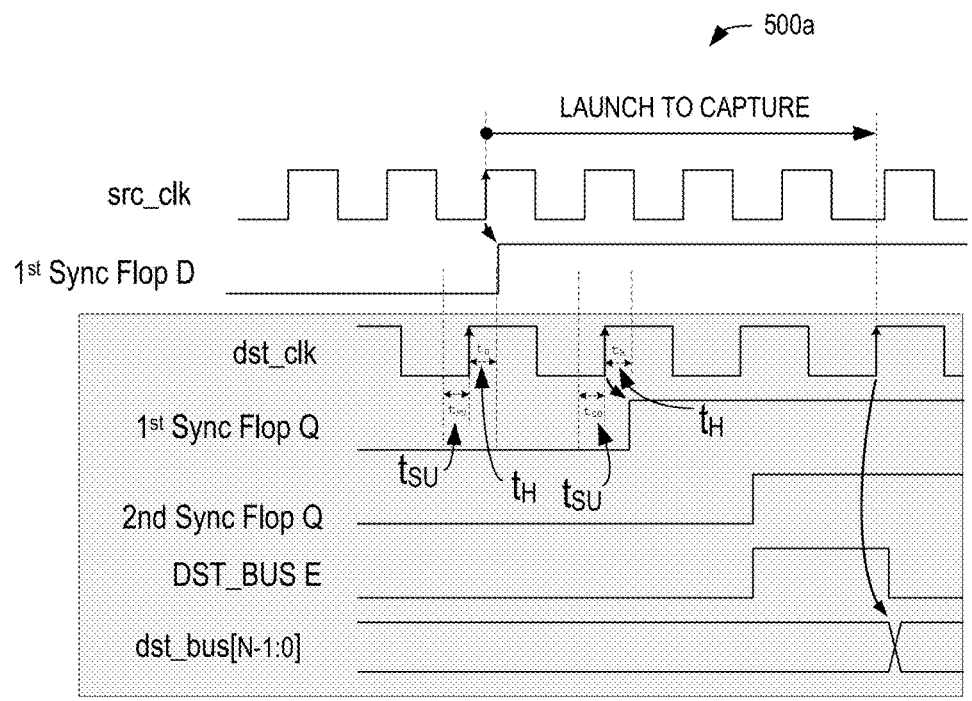
FIG. 5 shows an example timing diagram for the transfer of data between the clock domains through the use of a toggle flip-flop whose output is synchronized to generate an enable pulse which triggers the sampling of bridged data.
Figure 5:
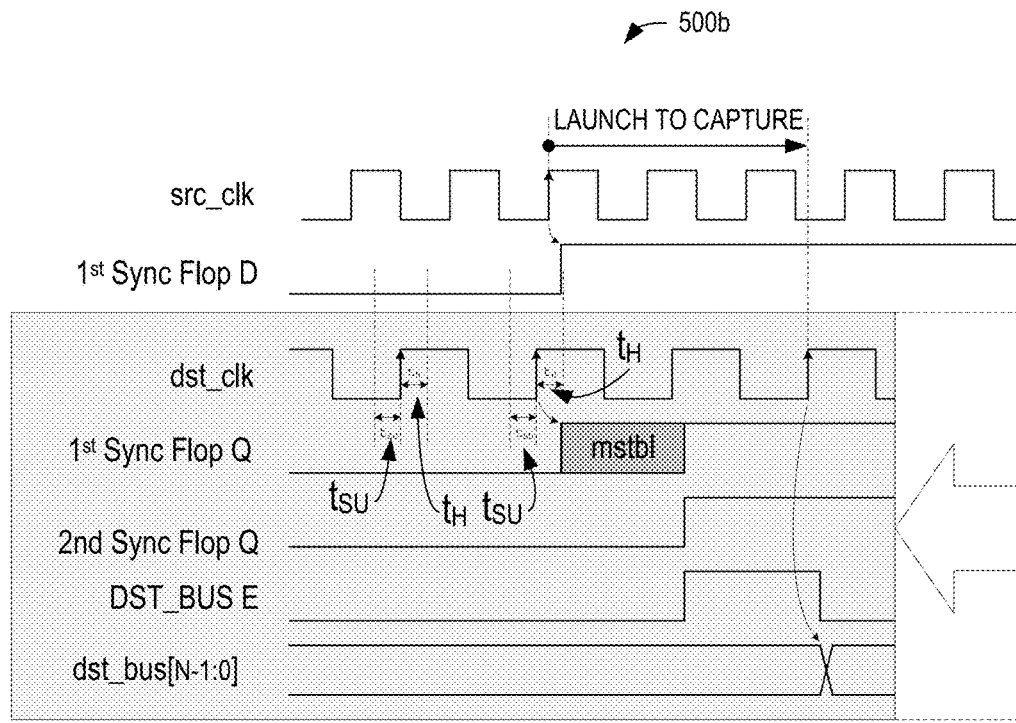

It is assumed that src_clk 110 and dst_clk 108 are asynchronous to each other for purposes of this description. The clocks may have different frequencies or the same, and no phase relationship is assumed between them. After data is shifted into the BUS_SYNC register 126, the circuit operates as intended (e.g., without the loss or corruption of data) as long as changes on the Q-pin outputs of BUS_SYNC register 126 propagate to the DST_BUS register 120 D-pin inputs (with setup-time margin) by the rising edge of dst_clk 108 when the E-pin (enable) input pin of DST_BUS register 120 is high. In other words, the BUS_SYNC-to-DST_BUS timing path is to be configured to be less than the time it takes to get the Toggle Flip-Flop 106 signal synchronized across the synchronization flip-flops 112 and 114 to enable the DST_BUS register 120. The synchronization time varies depending on the alignment of the src_clk 110 and dst_clk 108 rising edges. FIG. 5 illustrates how this interval of synchronization time can vary by showing timing diagrams 500a and 500b illustrating launch-to-capture times for example event timings in a circuit, such as bridge 400 of FIG. 4.

The bridge 400 of FIG. 4 is more likely to fail as the launch-to-capture interval decreases. The shortest synchronization time occurs when the first synchronization flip-flop just catches the edge of the toggle flip-flop on its D input pin. This scenario is shown at the bottom of FIG. 5 (e.g., in timing diagram 500b). The first sync flop D input rises a little sooner than a hold time after the rising edge at its clock input pin. Since its hold time is violated, the sync flop output goes metastable. This can be resolved to either a logical '1' or '0', wherein a worst case occurs when it is resolved to '1'. The shortest sync time occurs when the metastable sync flop resolves such that the value after the toggle takes effect rather than the value before the toggle. The rising edge of dst_clk, where the BUS_SYNC value is captured by the DST_BUS register, occurs 2 clocks after the rising edge where the first sync flop goes metastable.

A detailed analysis of timing reveals the full static timing analysis (STA) constraint for a bridge circuit based on bridge 400 of FIG. 4:

$$(DCR+CQR+DDR)-(DCG+CQG+DDG) \leq 2*T_{DCYC}-t_{SU}-t_H-(DCS-DCD),$$

where the variables correspond to those described above in Table 1. Two substitutions may be used to simplify the inequality:

Let: DstClkSkew=DCS−DCD
Let: DataTravel=(DCR+CQR+DDR)−(DCG+CQG+DDG)

$$\text{DataTravel} \leq i*T_{DCYC}-t_{SU}-t_H-\text{DstClkSkew},$$

where i represents the number of synchronization flip-flops (e.g., the number of dst_clk cycles to be added to the DataTravel constraint). For the bridge circuit based on bridge 400 of FIG. 4, i=2, such that:

$$\text{DataTravel} \leq 2*T_{DCYC}-t_{SU}-t_H-\text{DstClkSkew}$$

When this constraint is violated, the Data Bus Bridge (DBB) will fail, as the DST_BUS register will sample the output of the BUS_SYNC register too soon. Data will either be corrupted, assuming the flip-flops of the DST_BUS register go metastable, or the BUS_SYNC value prior to the data-shift will be captured. In either case an incorrect value will be output from the DST_BUS register after its E input pin pulses high. The constraint shown above may also apply to other clock domain crossing bridges than that shown in FIG. 4.

The variation of the DBB that includes another synchronization flip-flop, as shown in FIG. 3, adds another dst_clk cycle to the DataTravel constraint to produce a new constraint (here i=3):

$$\text{DataTravel} \leq 3*T_{DCYC}-t_{SU}-t_H-\text{DstClkSkew}.$$

While such an approach may appear to provide benefits with regards to preventing the loss or corruption of data, there may still be issues to be overcome with regard to performance and timing constraints. For example, high pulses on sync_valid_pulse must be further spaced apart, so that $T_{XMIT}$ is increased. Such spacing reduces the throughput rate. Additionally, a failure may still occur due to timing issues in such a bridge. For example, with a fast enough clock and/or a large enough DataTravel or DstClkSkew value, the above-referenced new constraint may also be violated. If so, then the DBB will still fail.

Figure 6:
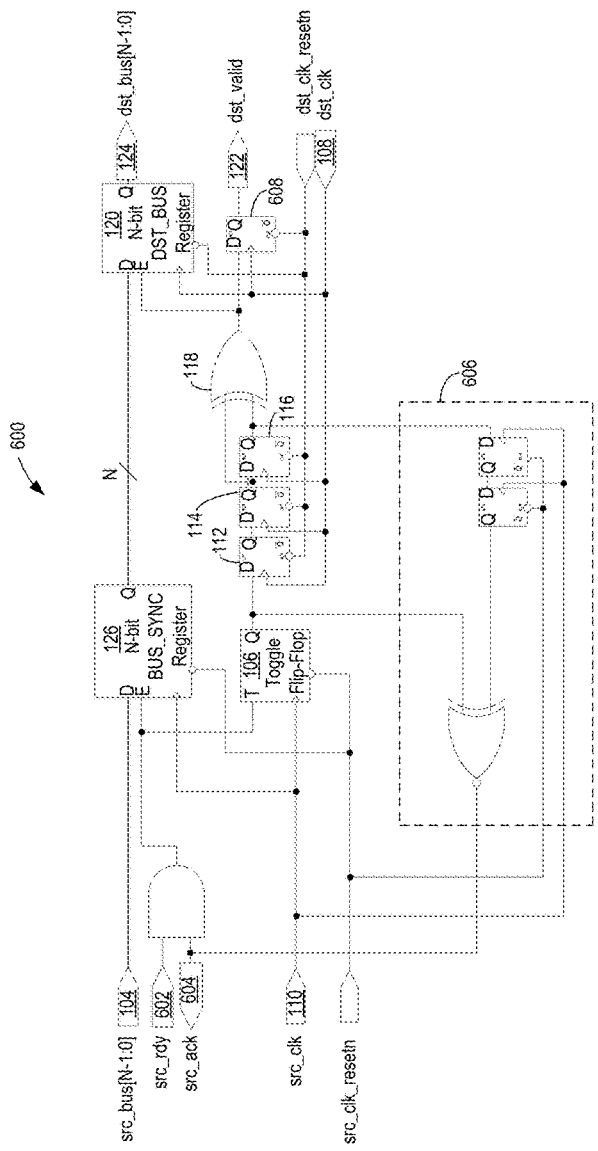
FIG. 6 shows an example data bus bridge with feedback.

Another variation of the DBB is shown in FIG. 6. DBB 600 works similarly to the one-way Data Bus Bridge described above (e.g., bridges 100, 300, and 400 in FIGS. 1, 3, and 4, respectively) except that the single src_valid_pulse signal is replaced with a pair of handshake signals 602 and 604, and feedback logic 606 has been added. This handshake pair includes "src_rdy" 602 and "src_ack" 604 and the feedback logic 606 is used to generate src_ack. The source which drives data onto src_bus[N−1:0] is configured to set src_rdy high whenever valid data is driven. The source is configured to hold data constant on src_bus[N−1:0] so long as src_ack is low, and may switch to new data only when src_ack is sampled high. High values sampled on both src_rdy 602 and src_ack 604 result in a shift of data into the BUS_SYNC register 126.

Simultaneously with the data shift, the Toggle Flip-Flop 106 toggles and src_ack 604 goes low, preventing data from shifting in on subsequent cycles. Src_ack 604 remains low until the toggle data has been synchronized to the dst_clk domain and then synchronized back. At the rising edge where data from BUS_SYNC register 126 is captured into the DST_BUS register 120, the holding flip-flop 116 on the dst_clk side toggles. This toggle value is then synchronized back to the src_clk side where it causes src_ack to go high again. A high value on src_ack allows new data to be shifted into the BUS_SYNC register 126 when src_rdy is high.

The static timing constraint for the inter-domain path is the same as the one-way Data Bus Bridge shown in FIG. 1. An additional synchronization flip-flop may be added to loosen this constraint in the manner described above with regard to FIG. 3.

In applications that utilize a high data-transfer rate between clock domains, it may be more appropriate to use an asynchronous FIFO. When the frequencies of the clocks in two domains are close or equal, the Data Bus Bridge may dramatically slow the rate of traffic flow. This is because a signal is to be synchronized across the domain boundary for each data word that passes. An asynchronous FIFO will queue data words into an array of registers while control logic is given time to synchronize tracking information between the domains. An interface and timing from a standard synchronous FIFO design may be utilized in the asynchronous FIFO examples described below.

Figure 7:
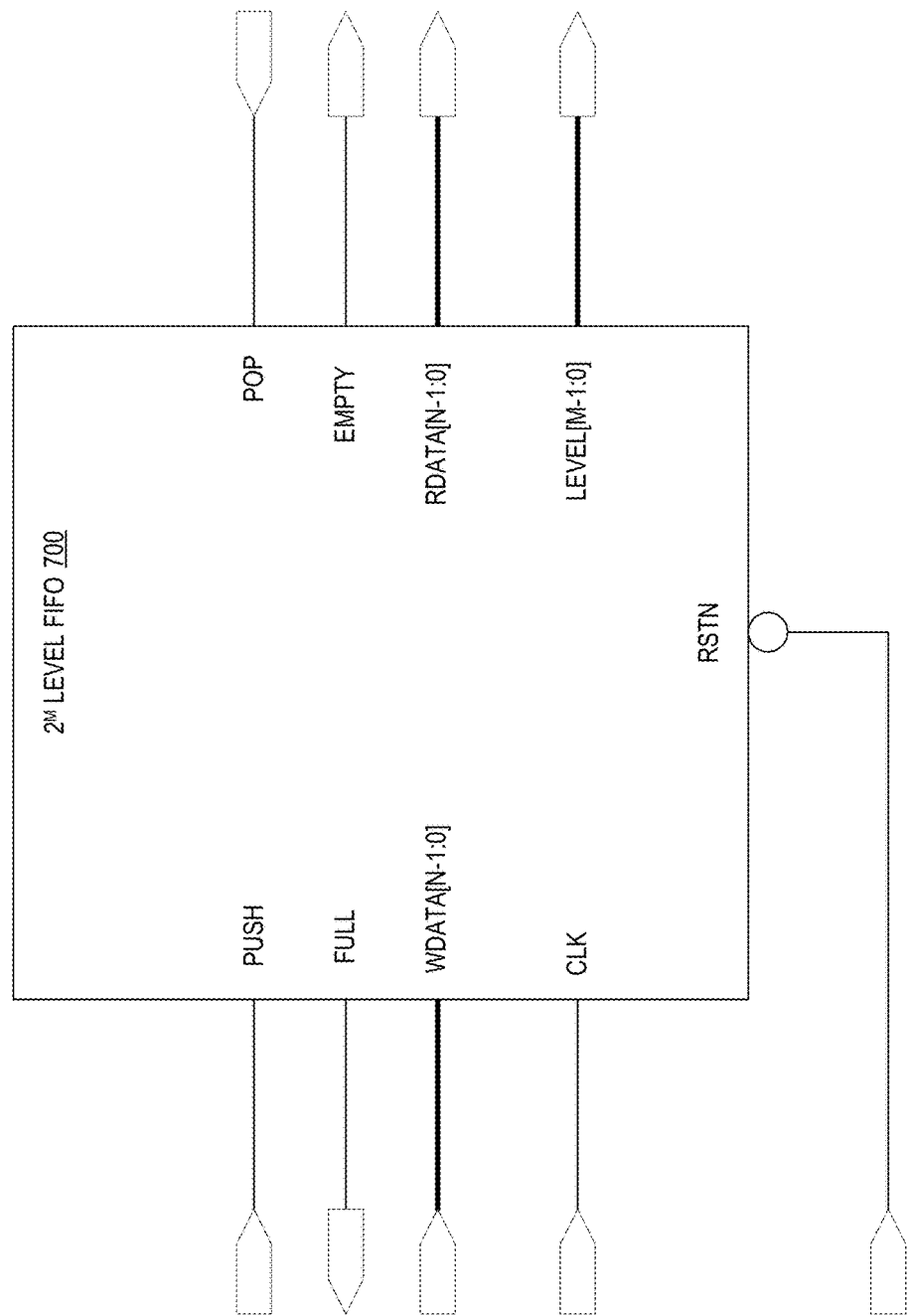
FIG. 7 shows an example interface to a synchronous first in first out (FIFO) circuit.

FIG. 7 shows an example of a standard synchronous FIFO 700. N represents the word size—number of bits per cycle transferred in or out. M represents the number of bits to represent the highest level—full level—while $2^M$ represents the FIFO depth or total number of words that can be queued into the FIFO. Table 2 below provides definitions for each of the signals shown in FIG. 7.

If a data word is pushed into the FIFO when the FIFO is full, the FIFO will go into an indeterminate state and will lose data previously written. This is called FIFO overflow. If a data word is popped out of the FIFO when the FIFO is empty, the FIFO will also go into an indeterminate state and will return invalid data on the RDATA bus. This is called FIFO underflow.

TABLE 2

| Signal Name | Description |
| --- | --- |
| CLK | The single clock which drives all internal logic. |
| PUSH | When high, data from the N-bit WDATA input bus is queued in internal storage. |
| FULL | When high, indicates that the FIFO is full and cannot accept any new data from the WDATA input. If PUSH is sampled high when FULL is high, FIFO overflow will occur. |
| WDATA[N−1:0] | The N-bit input data bus where words are transferred into the FIFO. |
| POP | When high, data from the FIFO is de-queued and transferred out on the N-bit RDATA bus. |
| EMPTY | When high indicates that the FIFO is empty and no data can be transferred out. If POP is sampled high when EMPTY is high, FIFO underflow will occur. |
| RDATA[N−1:0] | The N-bit output data bus where words are transferred out of the FIFO. |
| LEVEL[M−1:0] | Specifies how many data words have been queued into the FIFO - the total number of PUSH high cycles minus the total number of POP high cycles. |
| RSTN | An active-low asynchronous reset. |

Figure 8:
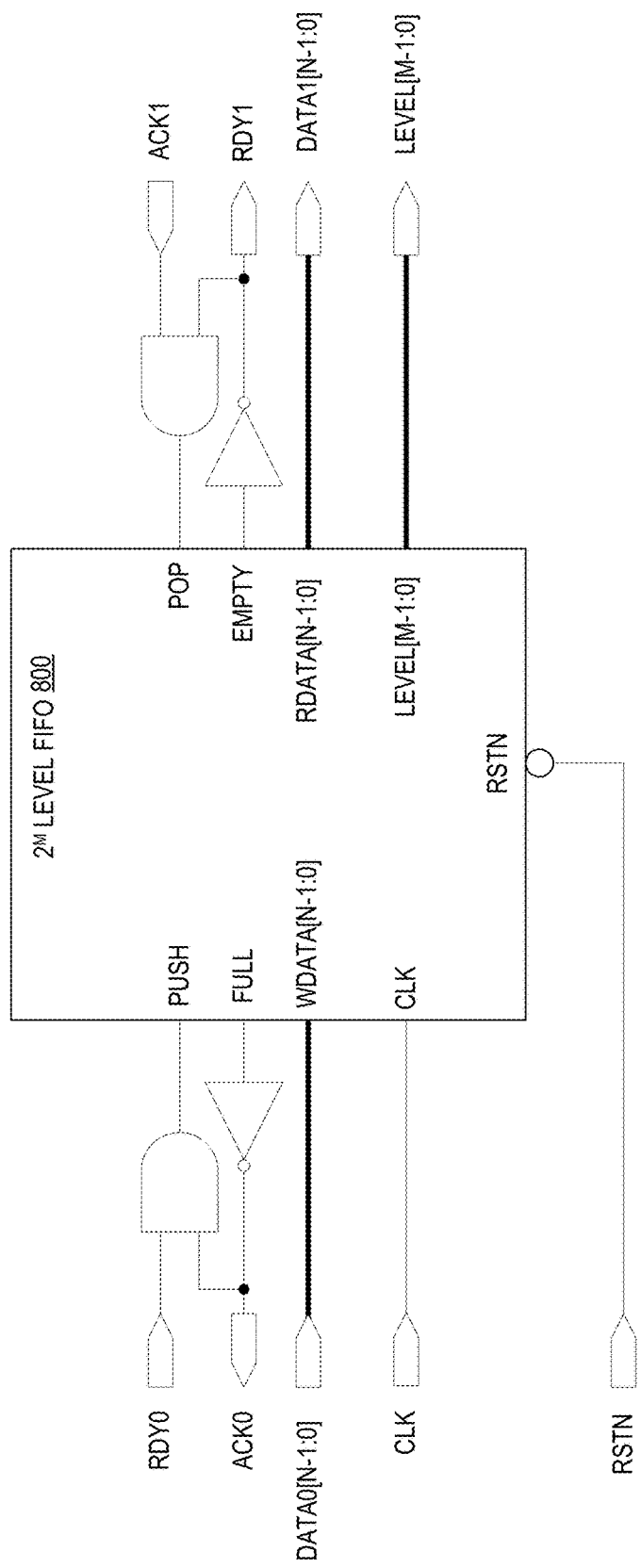
FIG. 8 shows an example logic circuit for preventing overflow and underflow in a FIFO circuit.

A wrapper may be put around the FIFO to prevent FIFO overflow or underflow from occurring. FIG. 8 shows an example of logic that can be added to implement this wrapper around an example FIFO 800. The input and output interfaces change as a result. The wrapper illustrated in FIG. 8 makes the device more suitable as a component in a pipeline which implements flow control as a two-way handshake between stages. An upstream pipeline stage interfaces to the RDY0, ACK0, and DATA0 signals while the RDY1, ACK1, and DATA1 signals interface to a downstream stage. Table 3 provides definitions for these signals.

TABLE 3

| Signal Name | Description |
| --- | --- |
| RDY0 | When high, indicates that valid data is present on the N-bit DATA0 input bus and is ready to be shifted into the FIFO. When low, DATA0 is not valid and is to be ignored by the FIFO. Data only shifts into the FIFO when ACK0 is sampled high on the same rising edge that RDY0 is high. Otherwise, when RDY0 is high and ACK0 is low, the value presented on DATA0 is to be held constant. |
| ACK0 | When high, indicates that the FIFO is ready to accept any new data from the DATA0 input bus whenever RDY0 is high. Data only shifts into the FIFO when ACK0 is sampled high on the same rising edge that RDY0 is high. Otherwise, when RDY0 is high and ACK0 is low, the value presented on DATA0 is to be held constant. |
| DATA0[N-1:0] | The N-bit input data bus where words are transferred into the FIFO. |
| RDY1 | When high, indicates that valid data is present on the N-bit DATA1 output bus and is ready to be shifted out of the FIFO. When low, DATA1 is not valid and is to be ignored by downstream logic. Data only shifts out of the FIFO when ACK1 is sampled high on the same rising edge that RDY1 is high. Otherwise, when RDY1 is high and ACK1 is low, the value presented on DATA1 will be held constant and downstream is not expected to sample it. |
| ACK1 | When high, indicates that downstream logic is be ready to accept any new data from the DATA1 output bus whenever RDY1 is high. Data only shifts out of the FIFO when ACK1 is sampled high on the same rising edge that RDY1 is high. Otherwise, when RDY1 is high and ACK1 is low, the value presented on DATA1 is be held constant. |
| DATA1[N-1:0] | The N-bit output data bus where words are transferred out of the FIFO. |

Figure 9:
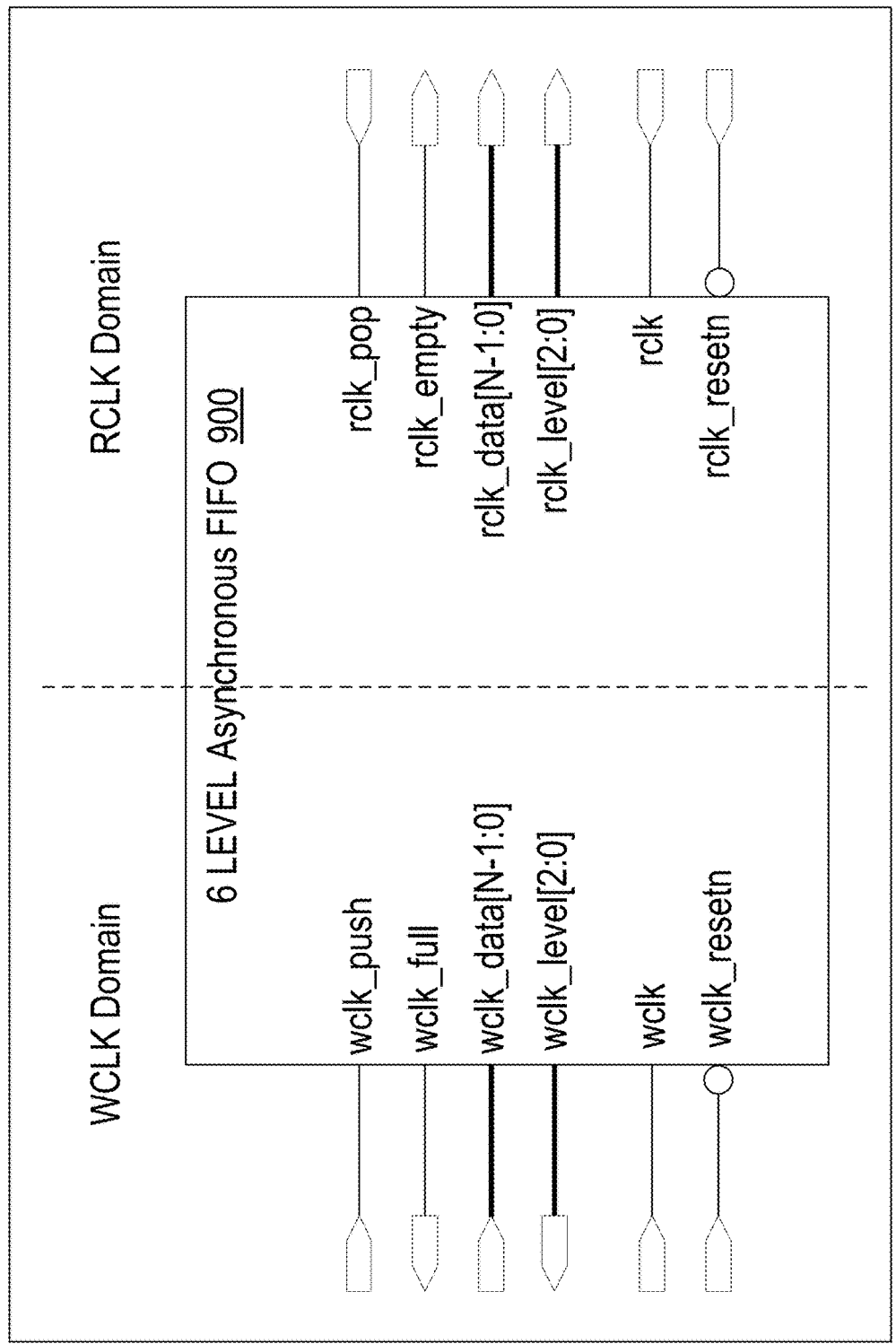
FIG. 9 shows an example interface to an asynchronous FIFO bridge circuit.

For an asynchronous FIFO, an interface like the one shown in FIG. 7 is redefined so that signal groups are separated into two clock domains, as shown in 6-level asynchronous FIFO 900 of FIG. 9. N represents the word size, or the number of bits per cycle transferred in or out. Here the FIFO depth is 6, meaning there are 6 levels. This means that the greatest number of data words that could be queued at one time is 6. Some of the signals shown in FIG. 7 have two versions in FIG. 9. This is so that there may be one version in each clock domain. These include the level (e.g., wclk_level and rclk_level), clock (e.g., wclk and rclk), and reset signals (e.g., wclk_resetn and rclk_resetn).

The following are recommendations for the design of an asynchronous FIFO that may be followed in order to ensure that it is fully functional:
- the FIFO is not to overflow, meaning the write pointer is not to bypass the read pointer;
- the FIFO is not to underflow, meaning the read pointer is not to bypass the write pointer;
- throughput is to match the rate of the slowest of the two clocks, but also throughput is to depend on data availability (e.g., flow control) outside the FIFO; and
- throughput is not to depend on characteristics of the FIFO itself.

Like the standard synchronous FIFO (e.g., as illustrated in FIG. 7), the asynchronous FIFO 900 will overflow when wclk_push is asserted while wclk_full is high. Also, the FIFO 900 will underflow when rclk_pop is asserted while rclk_empty is high. A wrapper like the one shown in FIG. 8 may be provided for FIFO 900 (e.g., logic corresponding to that shown in FIG. 8 may be added/integrated to/with FIFO 900) to prevent overflow/underflow and to make the device more suitable for a pipelined architecture.

Figure 10:
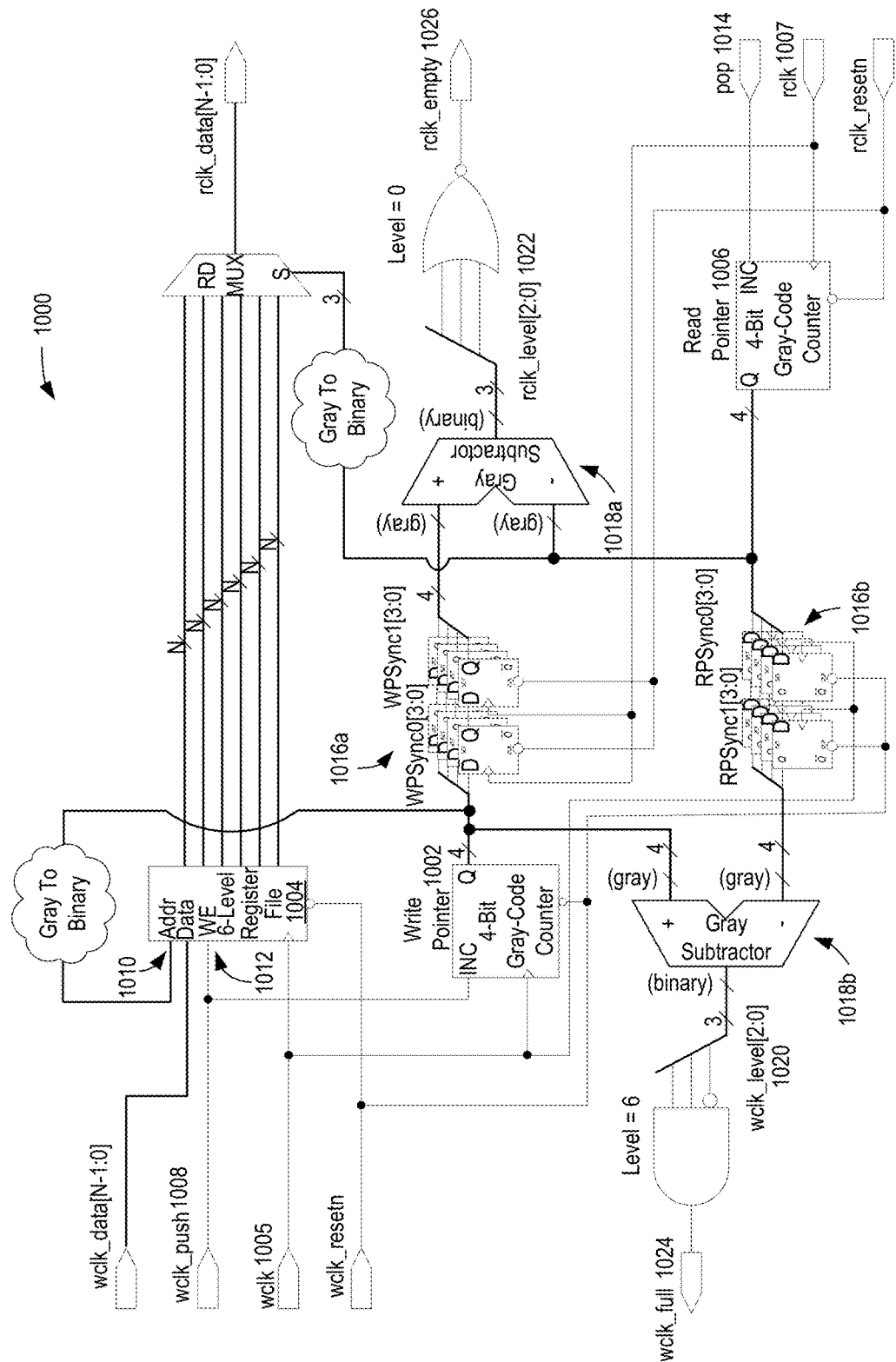
FIG. 10 shows an example diagram of an asynchronous FIFO bridge circuit having six levels.

A block diagram for an example asynchronous FIFO 1000 is shown in FIG. 10. As compared with other implementations, the illustrated FIFO 1000 is configured to be economical in operation. In other words, FIFO 1000 uses fewer resources and has a lower gate count that other example asynchronous FIFOs.

A write pointer 1002 tracks locations in a register file 1004 where incoming data words are to be written. The write pointer 1002 and the register file 1004 may be clocked by a write clock, wclk 1005. A read pointer 1006 tracks locations from the same register file 1004 where outgoing data words are to be read from. The read pointer 1006 is shown clocked by a read clock, rclk 1007. For every cycle where wclk_push 1008 is high, a new data word is written into the 6-Level Register File 1004 at a location derived from the write pointer 1002. This register file 1004 includes 6 registers, each N bits wide. Registers are written one at a time based on an address (e.g., the "Addr" input 1010) and an active-high write enable (e.g., the "WE" input 1012).

Figure 11:
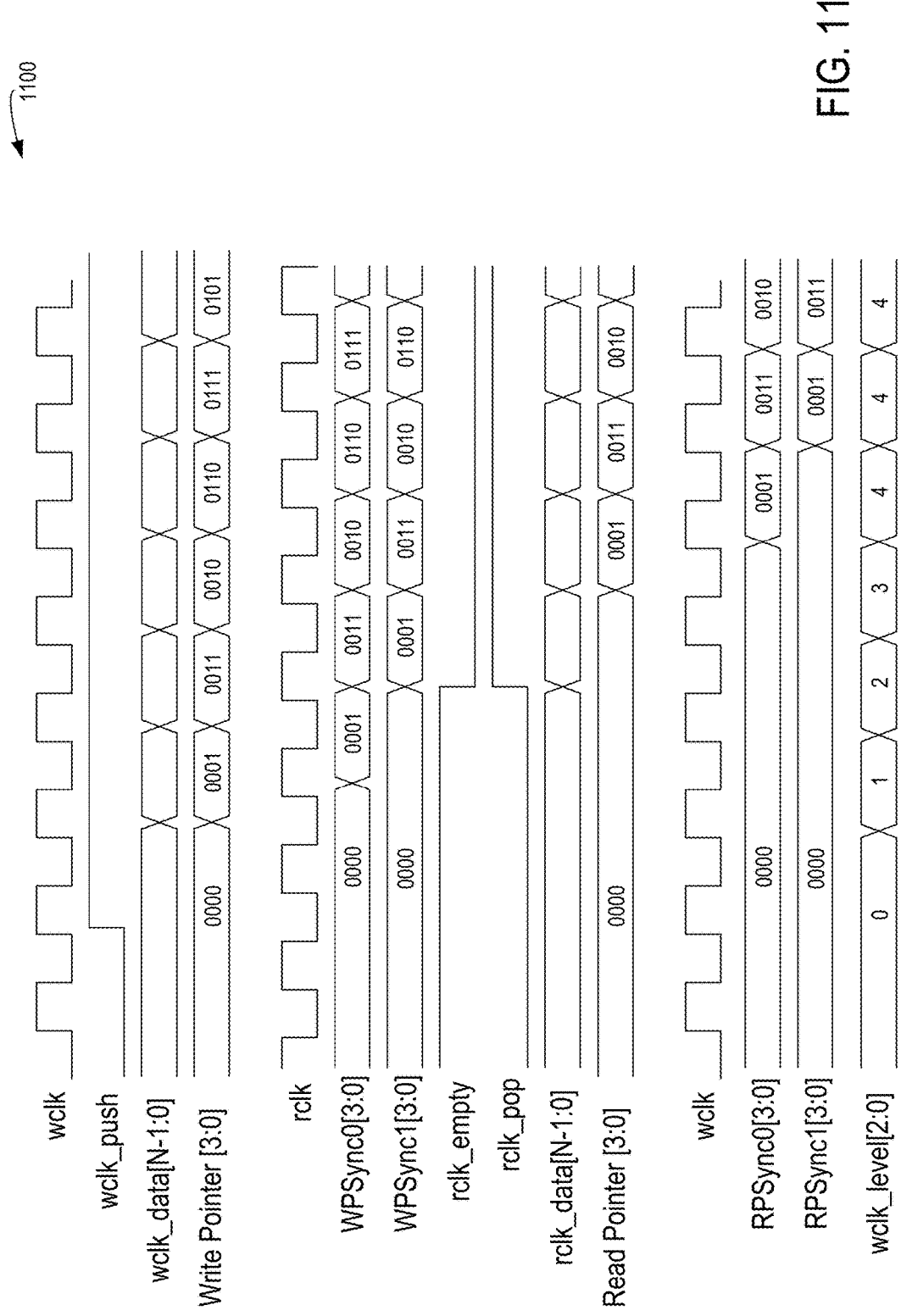
FIG. 11 shows an example timing diagram for burst-in/burst-out timing of an asynchronous FIFO circuit.

FIG. 11 illustrates a timing diagram 1100 that shows how data may be burst-written into the FIFO 1000 of FIG. 10 on one domain and burst-read out on the other domain of FIFO 1000 of FIG. 10 without any interruptions, under the assumption that the frequencies of wclk 1005 and rclk 1007 are close or the same. It is to be understood that the signals illustrated in FIG. 11 correspond to the associated components illustrated in FIG. 10.

The write and read pointers are shown implemented as gray-code counters, as FIG. 10 illustrates. Each cycle where wclk_push 1008 is sampled high results in only one bit of the write pointer changing. Likewise, each cycle where rclk_pop 1014 is sampled high results in only one bit of the read pointer 1006 changing. Each gray-code bit is synchronized independently to the other clock domain using two flip-flops cascaded together (e.g., flip-flop pair 1016*a* including WPSync0 and WPSync1 in the wclk domain and flip-flop pair 1016*b* including RPSync0 and RPSync1 in the rclk domain). This provides a synchronized version of the write pointer in the rclk domain and a synchronized version of the read pointer in the wclk domain.

A "Gray Subtractor" function may be used to compute the difference between the two pointers based on this formula:

Level=(to_binary(write_pointer)−to_binary(read_pointer))%6, where to_binary( ) is a function that converts a gray-code value to its binary equivalent and the '%' or modulo operator adjusts the result by adding or subtracting 6 any number of times until a value between 0 and 5 remains. Each Gray Subtractor instance 1018*a*/1018*b* is shown generating a FIFO level in its domain synchronous to the domain's clock:

wclk_level[2:0] 1020, and rclk_level[2:0] 1022.

The wclk_full signal 1024 is generated from wclk_level 1020 by decoding a value of 6, meaning that it will go high when the FIFO appears to have 6 data words queued into it. The rclk_empty signal 1026 is generated from rclk_level 1022 by decoding a value of 0, going high when it appears to have no data words queued into the FIFO.

Note that each of the level values calculated will not be accurate when the pointer in the opposite clock domain is transitioning or has recently transitioned. The synchronized version of each pointer will lag behind the actual pointer in such cases. However, the levels calculated in each domain will either be accurate or conservative with respect to the previously mentioned FIFO design recommendations.

In the wclk domain, the recommendation is not to push in a new data word when the FIFO 1000 is full. The write pointer runs ahead of the read pointer, and when the write pointer is ahead by 6, the FIFO level is to read "6" or "full." A version of the read pointer that lags behind the actual pointer will fall further behind, so the level calculated will be interpreted to be "full" at or before the point where the FIFO actually becomes full. Whether wclk_full goes high at the full point or sooner does not matter in the scope of operation of the circuit, since either case will prevent wclk_push from being asserted while the FIFO is full, which will prevent overflow from occurring.

In the rclk domain, the recommendation is that the circuit not pop out a new data word when the FIFO 1000 is empty. The read pointer "chases" the write pointer, and when it catches up, the FIFO level will read "0," or "empty." A version of the write pointer that lags behind the actual pointer will be closer to the actual read pointer, so the level calculated will be interpreted to be "empty" at or before the point at which the FIFO actually becomes empty. Whether rclk_empty goes high at the empty point or sooner does not matter in the scope of operation of the circuit, since either case will prevent rclk_pop from being asserted while the FIFO is empty, which will prevent underflow from occurring.

After synchronization, a gray code value resolves to either the current code or the next code. In contrast, in a binary counter, a single rising edge of the clock will sometimes trigger transitions in multiple bits. With the right alignment between rising edges in the two clock domains (e.g., wclk and rclk), these transitions will cause the corresponding flip-flops in the first layer of synchronization to go metastable. A metastable flip-flop may be resolved independently from the others to either a '1' or a '0' by the second-layer synchronization flip-flop. This means that a transition from one binary code to another may be resolved as neither the first nor the second value, but a completely different one. The code may appear to jump erratically to some arbitrary value as it transitions. This would translate to false FIFO levels and inaccurate empty/full status.

The minimum number of FIFO levels that will prevent the architecture from slowing throughput is 6. Consider the following example scenario:

The two clocks (e.g., wclk and rclk) are running at the same frequency.

The FIFO 1000 is initially empty.

An upstream device begins to push a long burst of data words into the FIFO where a word is pushed in on every clock.

As soon as the changing write pointer value is synchronized over to the rclk domain, the rclk_empty signal goes low and a downstream device immediately begins to pop each and every data word out of the FIFO.

The changing read pointer is then synchronized back to the wclk domain.

In the above scenario, as each data word is pushed into the FIFO 1000, the FIFO level in the wclk domain increments since it represents a difference between an incrementing write pointer and a static synchronized read pointer. Data words may be pushed into the FIFO so long as this level remains below "full" which is a level of 6. Reaching the full level causes the wclk_full signal to be asserted which prevents further data from being pushed in. This slows incoming traffic flow. In order to prevent the level from reaching full, the synchronized version of the read pointer must begin incrementing before the difference between the pointers equals the full level. The synchronized version of the read pointer will only begin incrementing after the actual read pointer begins incrementing. The actual read pointer will only begin incrementing after the FIFO level on the rclk side becomes non-zero, or not empty, and the downstream logic is ready to accept data words from the FIFO. This rclk level will only become non-zero after the synchronized version of the write pointer begins incrementing as a result of the actual write pointer starting to increment on the wclk side. In other words, changing pointer values must make the round trip from the wclk side, to the rclk side and back again before the wclk FIFO level can stabilize—stop incrementing—and avoid an assertion of wclk_full.

In the case where the frequencies of wclk 1005 and rclk 1007 are the same, it takes 3 cycles for the changing write pointer to be synchronized over to the rclk domain and 3 more cycles (assuming the downstream device can accept data words immediately) for the read pointer to begin incrementing and for its changes to be synchronized back to the wclk domain. These 6 cycles make up the "round-trip time" for the asynchronous FIFO. This is the minimum amount of time it takes for push activity from the upstream device make the round trip and provide feedback to the wclk FIFO-level subtractor (e.g., gray subtractor 1018*b*).

However, a round-trip time of 6 assumes that the path delays between clock domains add up to less than a clock. Delay paths spanning from the gray-code counters to their first-layer synchronization flip-flops add to the round-trip time.

Consider a second example scenario with the following conditions:

The two clocks are running at exactly the same frequency.

The FIFO is initially full.

A downstream device begins to pop a long burst of data words out of the FIFO where a word is popped out on every clock.

As soon as the changing read pointer value is synchronized over to the wclk domain, the wclk_full signal goes low and an upstream device immediately begins to push new data words into the FIFO on every clock.

The changing write pointer is then synchronized back to the rclk domain.

Six levels allow a downstream device to pop data words out of an initially full FIFO on every clock while the changing read pointer is synchronized over to the wclk domain and the changing write pointer is then synchronized back to the rclk domain. Here too, in the case where the frequencies of wclk and rclk are the same, it takes 3 cycles for the changing read pointer to be synchronized over to the wclk domain and 3 more cycles for the upstream device to react and for the changing write pointer to be synchronized back to the rclk domain. Again, this assumes the constraints described above are met.

Analysis of these two scenarios, the initially full case and the initially empty case, shows that regardless of whether traffic flow is initiated from the upstream device or from the downstream device, the minimum round-trip time (RTT) is 6 cycles. In the case where the frequencies are different between the two domains, the minimum RTT is dominated by the slower of the two clocks. If the cycle time of one clock is greater than 3 cycles of the other, then the min RTT will be 3 of the slower clock's cycles. Otherwise, it will be somewhere between 3 and 6 cycles of the slower clock.

So long as space is available for data words while pointer changes are making the round trip, throughput performance will not be negatively affected. Since the FIFO level changes on each clock after traffic flow begins until the pointer changes have made the round trip, and since the worst-case RTT is 6, a FIFO size (depth) of 6 is all that is needed to prevent stalling and to maintain maximum throughput.

With one clock running faster than the other, and both the upstream and downstream devices ready for full-speed traffic flow, traffic will flow at one data word per clock in the slower clock domain while traffic experiences intermittent stalling in the other domain. This assumes timing path delay constraints are met as described below.

For the asynchronous FIFO 1000 shown in FIG. 10, there are three aspects of static timing that are to be analyzed to ensure proper operation:

1. Timing of the data path in comparison with timing of the control path.
2. Signal-path skew between gray-code counter bits.
3. Control-path delays that add to the round-trip time.

Each of these is discussed below.

Figure 12:
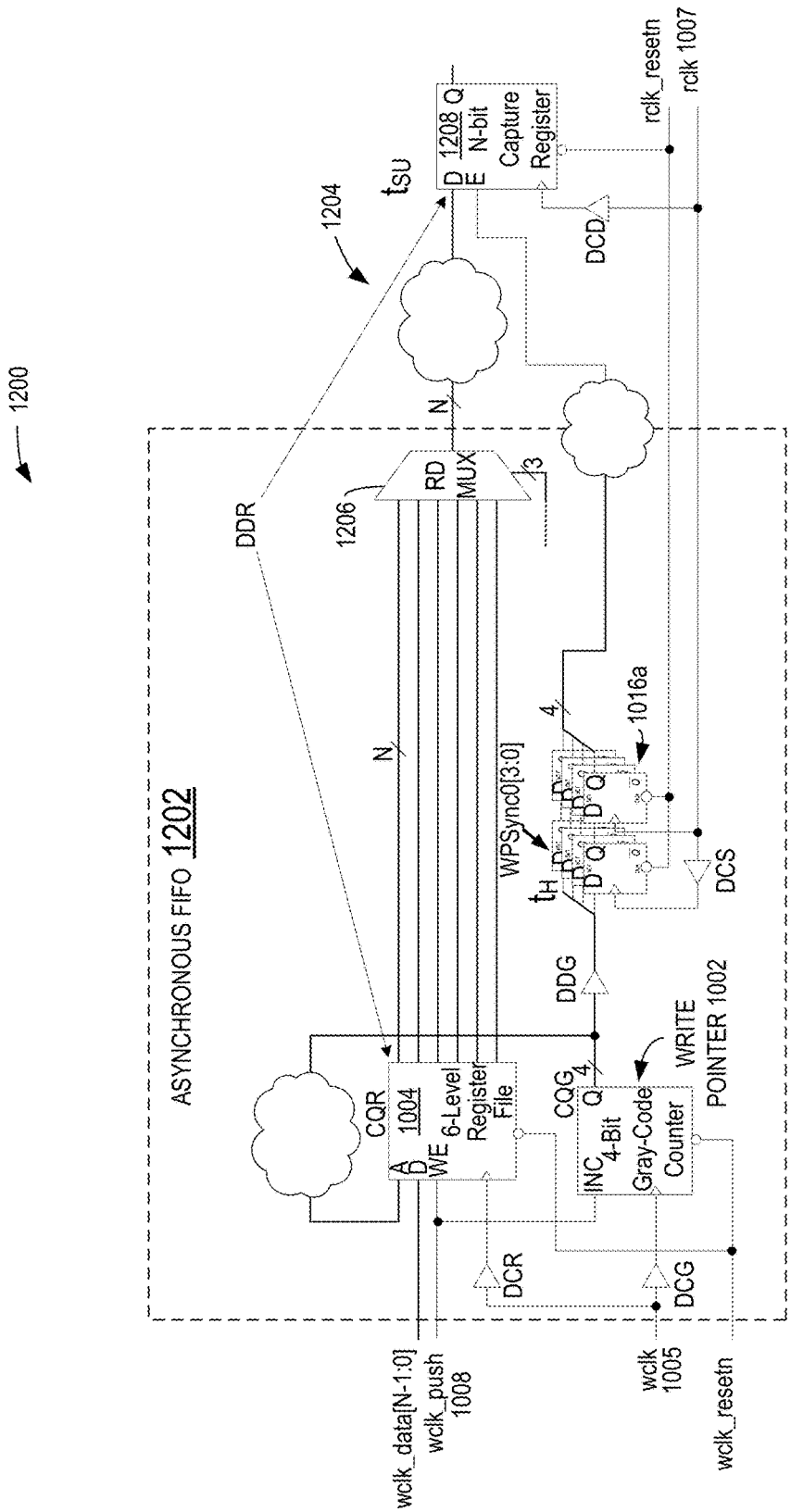
FIG. 12 shows an example diagram of a data path in an asynchronous FIFO circuit.

FIG. 12 shows a simplified diagram 1200 of the data path and control path which make up the wclk-to-rclk logic of an asynchronous FIFO 1202, which may include components of FIFO 1000 of FIG. 10. Also included is logic 1204 external to the FIFO which would normally be added to capture read data output from the FIFO (rclk_data[N−1:0]). Buffers are added and parameters for delays are annotated throughout the diagram which model post-layout timing for static timing analysis.

A timing path (DDR) exists from the register file 1004, through the read multiplexer 1206 and any external logic, to the capture register 1208. Another path (DDG) exists from the write pointer 1002—the 4-bit gray-code counter shown—to the WPSync0[3:0] synchronization flip-flops. A 2-cycle delay through the synchronization flip-flops 1016*a* will also add to the control-path timing.

TABLE 4

| Parameter | Description |
| --- | --- |
| DCR | Clock insertion delay to the register file flops |
| CQR | Clock-to-Q (output) delay of the register file flops |
| DDR | Path which includes routing and gates from the register file to the capture register |
| DCG | Clock insertion delay to the gray-code counter |
| CQG | Clock-to-Q (output) delay of the gray-code counter |
| DDG | Routing delay from the gray-code counter to the 1$^{st}$ layer of synchronization flops |
| DCD | Clock insertion delay to the capture register |
| DCS | Clock insertion delay to the WPSync0[3:0] flops |
| $t_{SU}$ | Flip-flop setup time of the capture register |
| $t_H$ | Flip-flop hold time of the WPSync0[3:0] flops |
| $T_{RCYC}$ | Minimum cycle time of the rclk clock |

The timing path between the register file 1004 and the capture register 1208 is exposed when the FIFO 1202 indicates that it is empty on the rclk side and the downstream device is ready to pop any new data as soon as it is written. In other words the timing path is exposed when the downstream device holds ACK1=1 while RDY1 transitions from 0 to 1, assuming wrapper logic exists.

Any possible alignment may occur between the rising edge of wclk 1005, which initiates the increment of the gray-code counter, and the rising edge of rclk 1007, which triggers WPSync0[3:0] to sample that change. So, the time between the assertion of wclk_push 1008 and the point at which the capture register 1208 samples the corresponding data written into the register file 1004 can vary depending on the alignment of the two clocks (e.g., wclk and rclk). The wclk/rclk alignment that makes control-path synchronization the shortest will determine the scenario where the asynchronous FIFO Bridge is most likely to fail.

Figure 13:
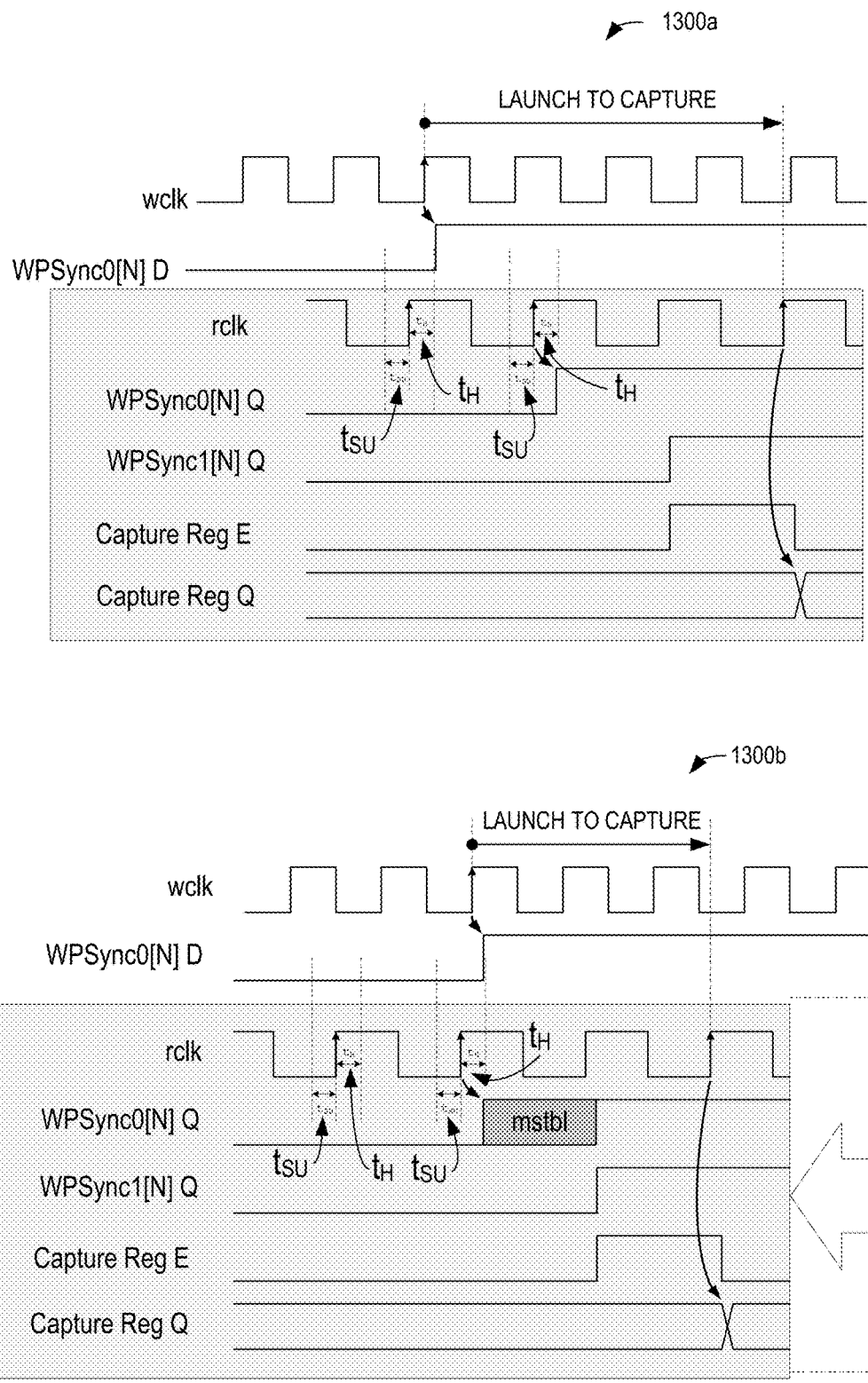
FIG. 13 shows an example timing diagram for synchronizing gray code change in a shortest possible time.

FIG. 13 shows timing diagrams 1300*a* and 1300*b* for two possible wclk/rclk alignments for the asynchronous circuit represented by diagram 1200 of FIG. 12. "N" represents the bit in the write pointer (gray-code counter) which toggles as a result of an assertion of wclk_push. On the left side of each waveform in the diagram, a pin name follows a signal name or block name. For example, "WPSync0[N] D" specifies the D input pin to bit "N" of the WPSync0 register.

At the top of the figure (e.g., in timing diagram 1300*a*), the bit-N change occurs well before the rclk rising edge—enough time to satisfy the WPSync0[N] setup time. At the bottom of the figure (e.g., in timing diagram 1300*b*), the gray code bit-N change just violates the WPSync0[N] hold time, causing it to go metastable. This metastability is then resolved to '1'—the value after the change.

As illustrated, the interval between when the gray-code counter increments and when the capture register samples FIFO output data ("Launch to Capture") is compressed in the waveform of timing diagram 1300*b*. The timing which results in the shortest possible data-path interval is shown in timing diagram 1300*b*.

Detailed analysis of timing, shown below, reveals an STA constraint of:

$$(DCR+CQR+DDR)-(DCG+CQG+DDG) \leq 2*T_{RCYC} - t_{SU} - t_H - (DCS-DCD)$$

Two substitutions may be used to simplify the inequality:
  Let: RclkSkew=DCS−DCD
  Let: DataTravel=(DCR+CQR+DDR)−(DCG+CQG+DDG)

$$DataTravel \leq i*T_{RCYC} - t_{SU} - t_H - RclkSkew,$$

where i represents the number of synchronization flip-flop layers (e.g., the number of rclk cycles to be added to the DataTravel constraint). For the bridge circuit based on bridge 1000 of FIG. 10, i=2, such that:

DataTravel≤2*$T_{RCYC}$-$t_{SU}$-$t_H$-RclkSkew.

If the above constraint is not met, then the Asynchronous FIFO Bridge will fail. The data read from the FIFO by the downstream device will be corrupted or incorrect in the case where the wrapper's RDY1=0 on one cycle and on the next cycle RDY1=1 and ACK1=1.

Figure 14:
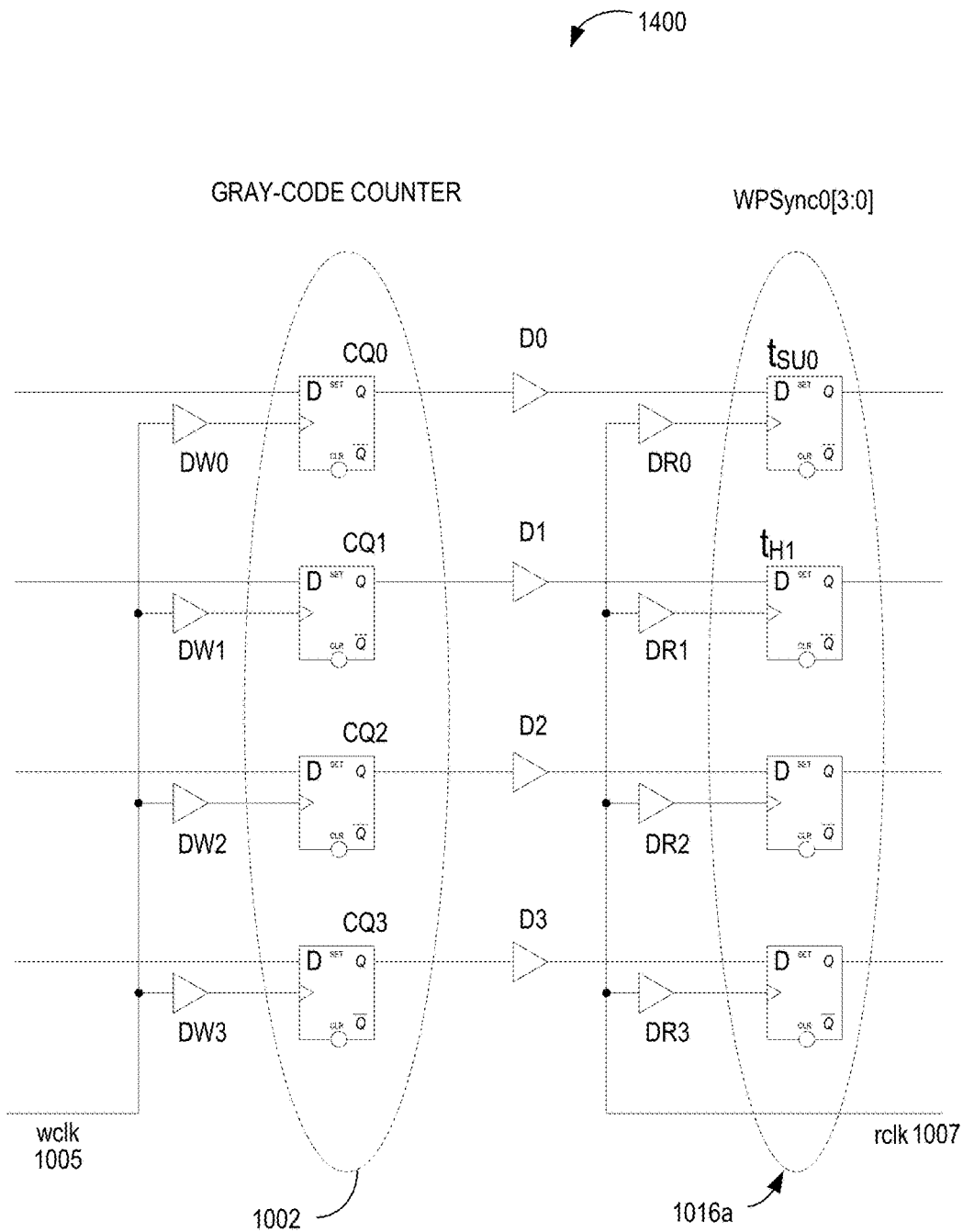
FIG. 14 shows an example diagram of cross-domain gray code signal path skew.

FIG. 14 shows a more detailed view 1400 of the write pointer gray-code counter 1002 and first layer (WPSync0[3:0]) of synchronization flip-flops from FIG. 10. Buffers are added and parameters for delays are annotated throughout the diagram for post-layout STA purposes. The added buffers and parameters for delays are defined below in Table 5.

As stated previously, a gray-code sequence is chosen because only one bit changes between adjacent codes. Therefore it may only be possible for one bit of the WPSync0[3:0] flops to go metastable. It is possible however for more than one of the WPSync0[3:0] flops to go metastable, for a given rising edge of rclk 1007, if there is excessive routing delay between the gray-code counter 1002 and WPSync0 as represented by D0, D1, D2 and D3, or if there is excessive clock skew on either side. In other words, signal-path routing delay and clock skew may work in concert with one another to skew the edges of successive gray-code transitions so that more than one bit is seen to change at a given point in time.

An example scenario of the above-described change is as follows:

wclk cycle time ($T_{WCYC}$) of 10 ns
CQ0=6 ns
CQ1=1 ns
D0=6 ns
D1=1 ns
All other delays=0 ns Gray code bit 0 changes on one clock followed by bit 1 changing on the next rising edge In such a case, the D input pins on both WPSync0[0] and WPSync0[1] would change at the same time. If the input pins changed near enough to the rising edge of rclk 1007, the flip-flops would both go metastable.

Figure 15:
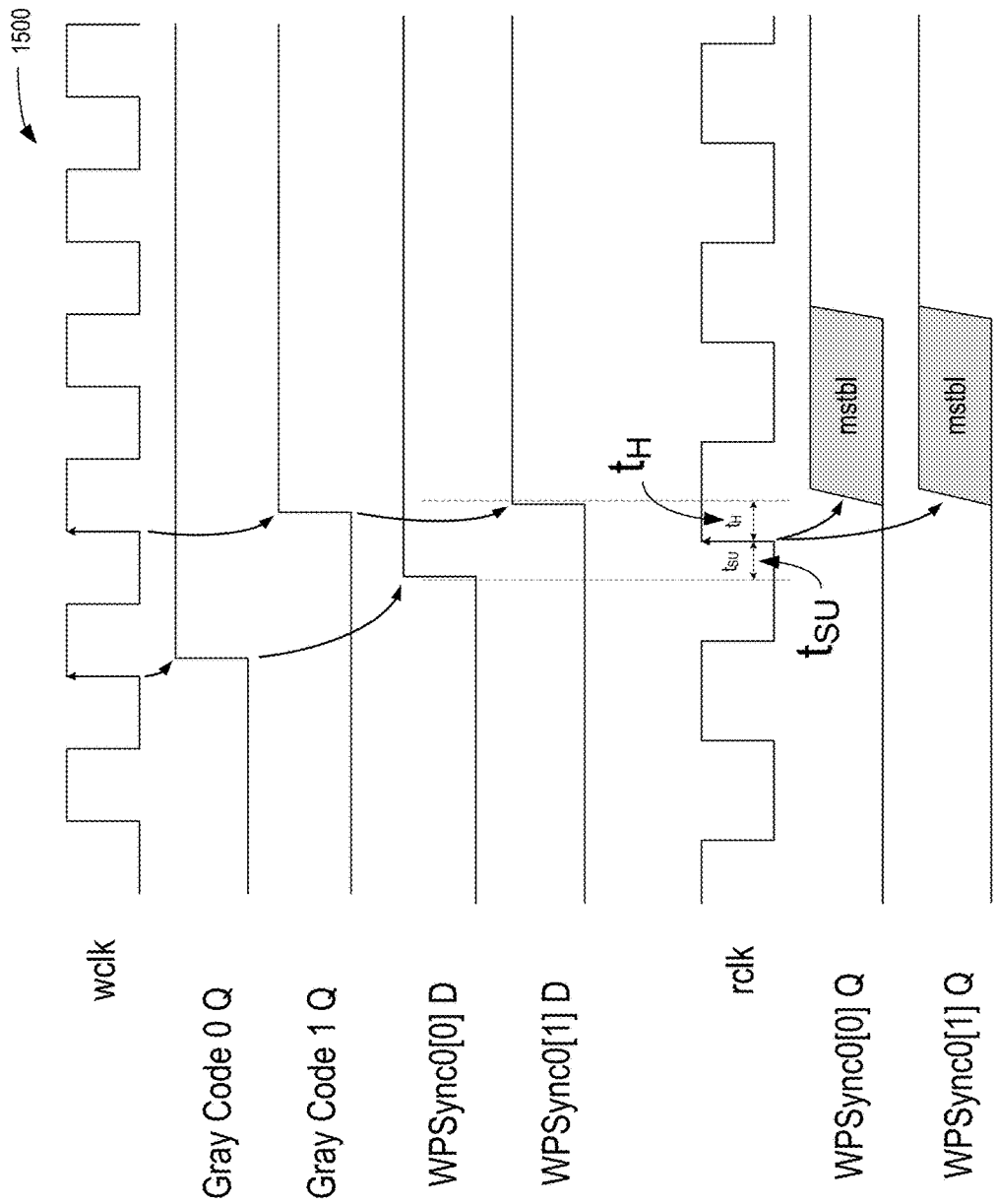
FIG. 15 shows an example timing diagram illustrating read clock edge samples.

FIG. 15 shows a timing diagram 1500 of example timings for signals output/input from/to components of FIFO 1000 of FIG. 10. In particular, FIG. 15 shows another example where the edge on the D input of WPSync0[0] just violates the flop's setup time ($t_{SU}$), and the edge on the D input of WPSync0[1] just violates the flop's hold time ($t_H$). STA constraints may be defined to avoid the scenario illustrated in FIG. 15. When one WPSync0[3:0] flip-flop goes metastable, then the configuration of the circuit must be such that it is not possible for any of the others to go metastable.

A more detailed analysis of timing is described below that, assuming a sequence with bit 0 changing first followed by bit 1, reveals the following STA constraint.

(DW0+CQ0+D0)−(DW1+CQ1+D1)≤$T_{WCYC}$−$t_{SU0}$−$t_{H1}$−(DR1−DR0)

Two substitutions may be used to simplify the inequality.
Let: RCLKSkew10=DR1−DR0
Let: SignalSkew01=(DW0+CQ0+D0)−(DW1+CQ1+D1)
The constraint then becomes the following.

SignalSkew01≤$T_{WCYC}$−$t_{SU0}$−$t_{H1}$−RCLKSkew10

TABLE 5

| Parameter | Description |
|---|---|
| DW0 | Clock insertion delay to the bit-0 flop of the gray-code counter |
| DW1 | Clock insertion delay to the bit-1 flop of the gray-code counter |
| DW2 | Clock insertion delay to the bit-2 flop of the gray-code counter |
| DW3 | Clock insertion delay to the bit-3 flop of the gray-code counter |
| CQ0 | Clock-to-Q (output) delay of the bit-0 flop of the gray-code counter |
| CQ1 | Clock-to-Q (output) delay of the bit-1 flop of the gray-code counter |
| CQ2 | Clock-to-Q (output) delay of the bit-2 flop of the gray-code counter |
| CQ3 | Clock-to-Q (output) delay of the bit-3 flop of the gray-code counter |
| D0 | Bit-0 routing delay between the counter flop and sync flop |
| D1 | Bit-1 routing delay between the counter flop and sync flop |
| D2 | Bit-2 routing delay between the counter flop and sync flop |
| D3 | Bit-3 routing delay between the counter flop and sync flop |
| DR0 | Clock insertion delay to the WPSync0[0] synchronizer flop |
| DR1 | Clock insertion delay to the WPSync0[1] synchronizer flop |
| DR2 | Clock insertion delay to the WPSync0[2] synchronizer flop |
| DR3 | Clock insertion delay to the WPSync0[3] synchronizer flop |
| $T_{WCYC}$ | Minimum cycle time of wclk |
| $T_{RCYC}$ | Minimum cycle time of rclk |
| $t_{SU0}$ | Flop setup time of the WPSync0[0] synchronizer flop |
| $t_{H1}$ | Flop hold time of the WPSync0[1] synchronizer flop |
| $t_{SUM}$ | Flop setup time of the WPSync0[M] synchronizer flop |
| $t_{HN}$ | Flop hold time of the WPSync0[N] synchronizer flop |
| RCLKSkewNM | DRN − DRM, where M and N are any of 0, 1, 2 or 3 |
| SignalSkewMN | (DWM + CQM + DM) − (DWN + CQN + DN), where M and N are any of 0, 1, 2 or 3 |

Skew between bits 0 and 1 of the gray-code counter are alone considered in the previous constraint. However, all combinations must be considered, as follows.

SignalSkew12≤$T_{WCYC}$−$t_{SU1}$−$t_{H2}$−RCLKSkew21

SignalSkew23≤$T_{WCYC}$−$t_{SU2}$−$t_{H3}$−RCLKSkew32

SignalSkew30≤$T_{WCYC}$−$t_{SU3}$−$t_{H0}$−RCLKSkew03

SignalSkew*MN*≤$T_{WCYC}$−$t_{SUM}$−$t_{HN}$−RCLKSkew*NM*

These combinations cover STA constraints for signal skew in the logic that synchronizes the write pointer over to the rclk domain. The logic that synchronizes the read pointer over to the wclk domain must also be constrained by the following:

$$SignalSkewMN \leq T_{RCYC} - t_{SUM} - t_{HN} - WCLKSkewNM$$

The above constraint is similar to the prior constraint, except that parameters in the above constraint represent delays associated with the read pointer instead of the write pointer.

If any of the above-identified constraints are not met, then the Asynchronous FIFO Bridge will fail. The synchronized bits of the gray-code pointer will be corrupted resulting in the code appearing to jump erratically to arbitrary values the same way a synchronized binary code would. This would translate to false FIFO levels and inaccurate empty/full status.

As described above, the simplest implementation of an asynchronous FIFO is one with 2 layers of synchronizers and a depth of 6. With 2 layers of synchronizers the round-trip time (RTT) is 6, and the FIFO depth is to at least match the RTT. This assumes though that path delays between clock domains add up to less than a clock.

When the frequencies of wclk and rclk differ significantly, the round-trip time does not play a role in FIFO throughput. Throughput is limited by the clock with the slowest frequency. When the frequencies are close or equal though, the round-trip time becomes a factor. If excessive path delays cause the round-trip time to exceed 6 clocks, then throughput will fall below the rate of the slower clock frequency.

Figure 16:
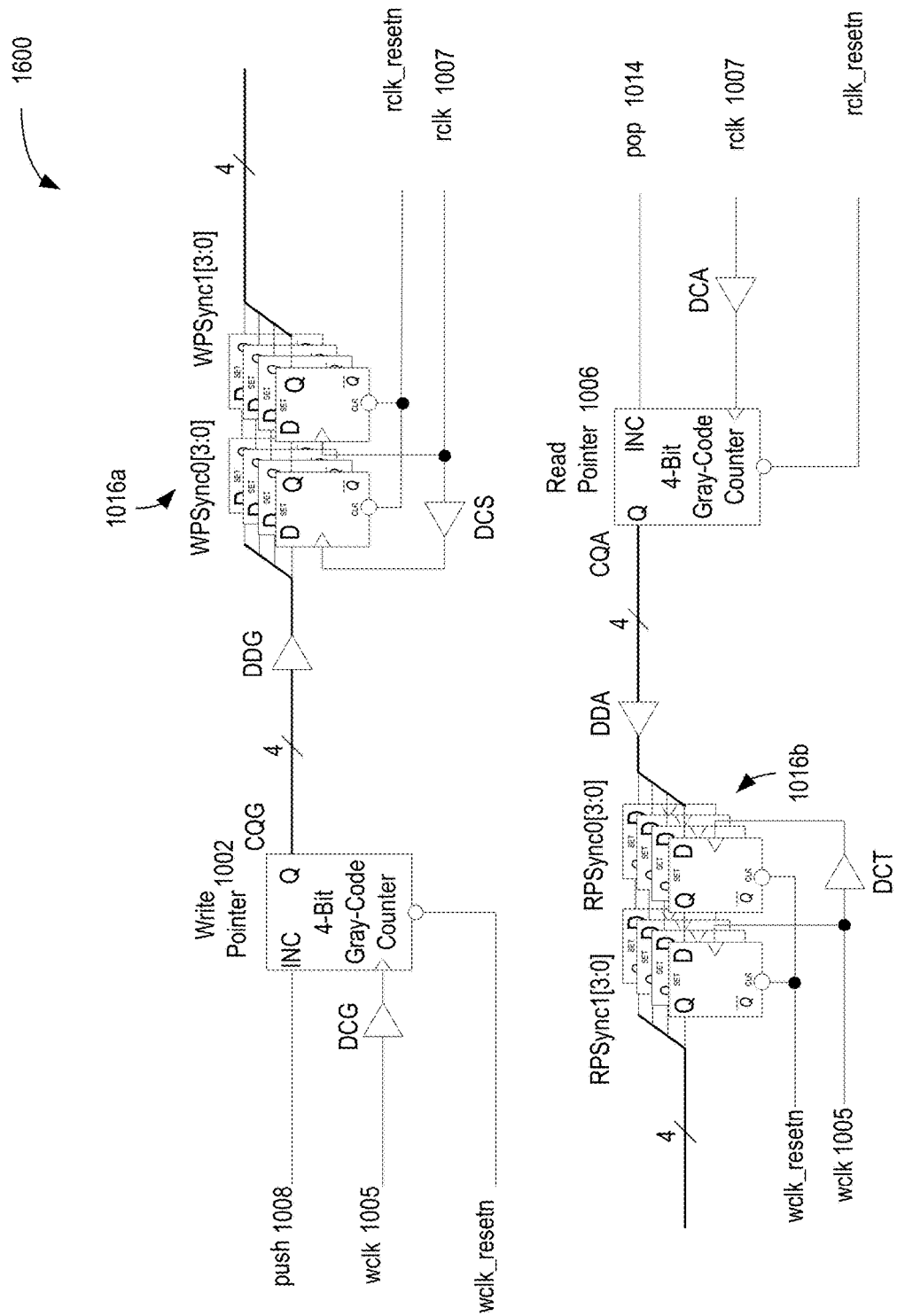
FIG. 16 shows an example block diagram illustrating a round-trip time static timing analysis.

FIG. 16 shows a diagram 1600 illustrating the gray-code counters and associated synchronizers for the write and read pointers from FIG. 10, with buffers added and parameters for post-layout delays annotated throughout the diagram. Table 6 defines the parameters shown in the figure.

TABLE 6

| Parameter | Description |
| --- | --- |
| DCG | Clock insertion delay to the Write Pointer |
| CQG | Clock-to-Q (output) delay of the Write Pointer |
| DDG | Routing delay from the Write Pointer to the WPSync0 |
| DCS | Clock insertion delay to the WPSync0 |
| DCA | Clock insertion delay to the Read Pointer |
| CQA | Clock-to-Q (output) delay of the Read Pointer |
| DDA | Routing delay from the Read Pointer to the RPSync0 |
| DCT | Clock insertion delay to the RPSync0 |
| $t_{SUW}$ | WPSync0 flip-flop setup time |
| $t_{SUR}$ | RPSync0 flip-flop setup time |
| $T_{WCYC}$ | The wclk cycle time |
| $T_{RCYC}$ | The rclk cycle time |
| $T_{CYC}$ | The minimum cycle time where $T_{WCYC} = T_{RCYC}$ |

Figure 17:
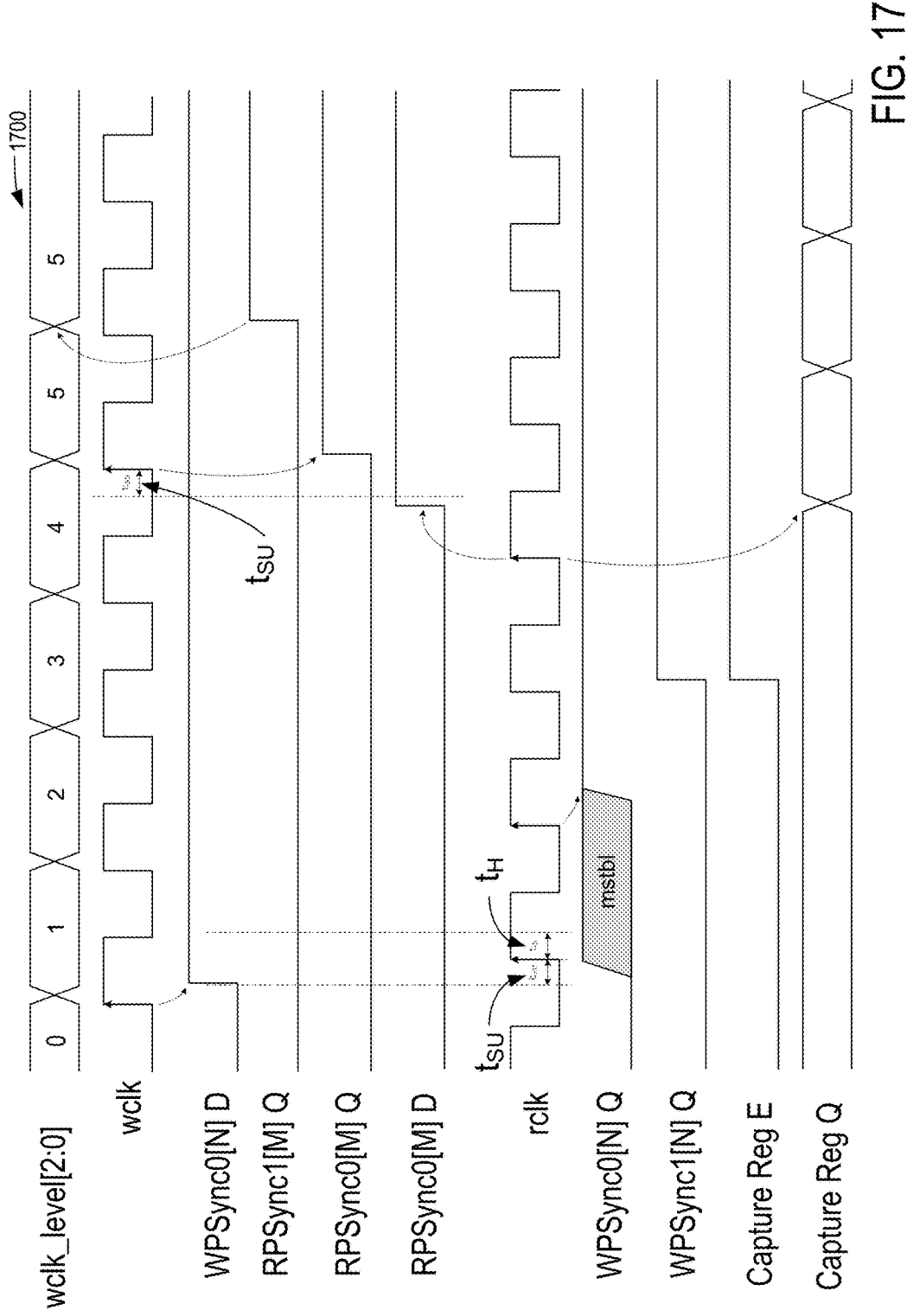
FIG. 17 shows an example timing diagram for round-trip timing in an asynchronous clock circuit.

FIG. 17 below shows an example timing diagram 1700 of components in FIFO 1000 of FIG. 10 for a scenario where the FIFO starts out empty, and then a continuous burst of data is pushed in from the wclk side while data is popped out in a continuous burst on the rclk side. "N" represents the bit in the write-pointer gray-code counter which toggles as a result of an assertion of wclk_push. Likewise, "M" represents the bit in the read-pointer gray-code counter which toggles as a result of an assertion of wclk_pop. On the left side of each waveform in the diagram, a pin name follows a signal name or block name. For example, "WPSync0[N] D" specifies the D input pin to bit "N" of the WPSync0 register.

At the top of FIG. 17, wclk_level[2:0] is shown starting out at 0 then incrementing as data words are pushed into the FIFO. The count continues while changes in the write pointer are synchronized over to the rclk domain, and changes in the read pointer are synchronized back to the wclk domain. Once the full round trip has been made, the count ceases to advance and remains constant at 5, which is one level below "full." Although the write pointer continues to increment, the synchronized version of the read pointer (RPSync1[3:0]) on the wclk domain increments also such that the difference between the two remains constant at 5.

Had the round-trip time been any longer, changes in RPSync1[3:0] would fall further behind, and the pointer difference would reach 6 where the wclk_full signal would be asserted. This would stall the upstream device feeding the FIFO and bring down the overall throughput rate.

The round-trip time is measured by clock cycles on both the wclk and rclk sides. However, delay time between the two clock domains will begin to contribute once it becomes excessive. An analysis of timing, shown in more detail below, reveals the full STA constraint:

$$(DCG+CQG+DDG+t_{SUW})-DCT+(DCA+CQA+DDA+t_{SUR})-DCS \leq T_{CYC} \qquad Eq\ 1$$

If the quantity on the left side of the above inequality exceeds $T_{CYC}$, the round-trip time will exceed 6 cycles and the FIFO will intermittently return "full" status on the wclk side and "empty" status on the rclk side—e.g., wclk_full and rclk_empty will intermittently pulse high. This will slow the throughput rate. However the FIFO will operate correctly otherwise, meaning that no data will be lost, duplicated, or corrupted and the state of the FIFO will remain determinate.

If Equation 1 is met and the frequencies of wclk and rclk differ, the throughput rate will be equal to the slower clock frequency. If Equation 1 is not met and the frequencies of wclk and rclk differ, the following equation is to be met for the throughput rate to be equal to the slower clock frequency:

$$(DCG+CQG+DDG+t_{SUW})-DCT+(DCA+CQA+DDA+t_{SUR})-DCS \leq T_{XCYC}+3*T_{\Delta},$$

where: $T_{\Delta}=|T_{WCYC}-T_{RCYC}|$, and $T_{XCYC}=\max(T_{WCYC}, T_{RCYC})$. If the above is not met, then throughput will be less than the slower clock frequency.

Derivations of Cross-Domain STA Constraints

More detailed derivations of the constraints described above are as follows. Two asynchronous clocks may be running at the same or different frequencies and any phase relationship can exist between them. However, at a given snapshot in time a specific phase relationship exists over a short interval. STA constraints for paths within a clock-domain bridge can be harder or easier to meet depending on this momentary phase relationship. Correct functional behavior is most likely to fail when the constraint is hardest to meet.

It is easier to represent when key clock edges occur by measuring them in "absolute time." Instead of measuring time relative to one particular clock, it can be measured using an independent time base. Symbolic parameters can be assigned to represent points where key rising edges occur on the roots of clocks. For example, the parameter "$T_R$" can be used to track when a key rising edge occurs on the rclk of a FIFO (e.g., FIFO 1000 of FIG. 10), while "$T_W$" tracks a key edge on a wclk of the FIFO. $T_R$ and $T_W$ are assigned absolute time values, meaning time based on a wall clock. For example:

$T_R$=8:45 AM, 22.485720486769 seconds
$T_W$=8:45 AM, 22.485720487981 seconds

Figure 18:
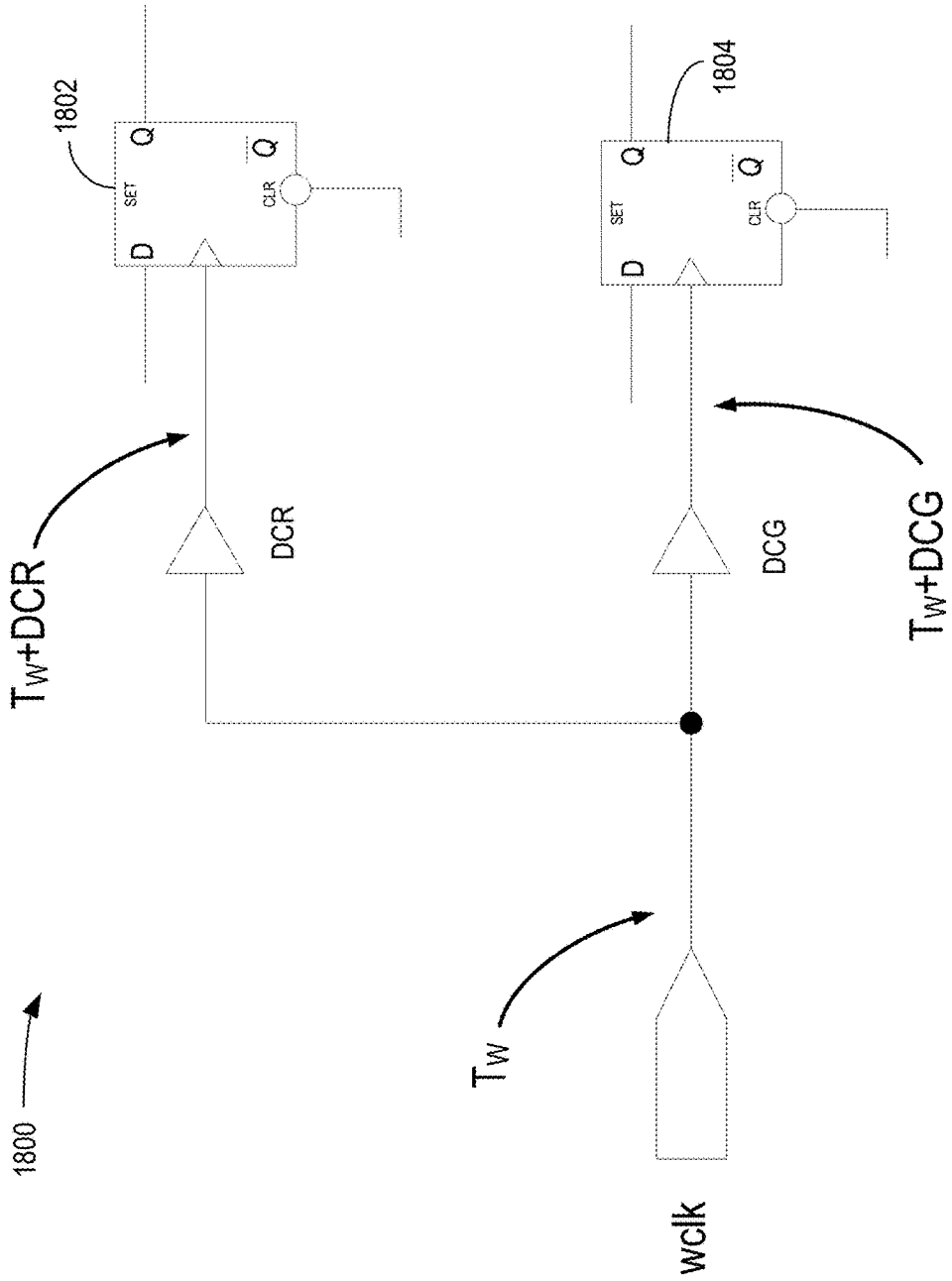
FIG. 18 shows an example logic diagram of a symbolic parameter.

These values are cumbersome to work with, so their symbolic parameters and quantities derived from them can be used in their place. FIG. 18 shows an example block diagram of a timing circuit 1800 illustrating how the key edge of wclk represented by $T_W$ propagates through buffers (DCR and DCG) representing insertion delays and arrives at clock input pins to flip-flops 1802 and 1804. The absolute time of the edge arriving at a clock input pin of an associated flip-flop is equal to the sum of $T_W$ and the insertion delay of the associated flip-flop. For example, the absolute time of the edge arriving at the clock input pin of flip-flop 1802 is the sum of $T_W$ and DCR, while the absolute time of the edge arriving at the clock input pin of flip-flop 1804 is the sum of $T_W$ and DCG.

Derivation of the Asynchronous FIFO Data Path Constraint

Referring back to FIGS. 12 and 13, as well as Table 4 to define variables presented below, FIG. 13 illustrates how the launch-to-capture interval between the register file and the capture register of FIG. 12 can change depending on the momentary phase relationship between wclk and rclk. The bottom of FIG. 13 (e.g., timing diagram 1300b) shows how the interval can shrink to a minimum as a result of a worst-case momentary phase relationship.

Here, the absolute time at which the rising edge of wclk occurs, triggering the write pointer (gray-code counter) 1002 to change, can be called "$T_W$." The absolute time at which the rising edge of rclk occurs, triggering the first synchronization layer of flip-flops (WPSync0[3:0]) to sample the output of the new gray-code value, can be called "$T_R$." Only one of the bits in the 4-bit gray code changes. This bit is referred to as "N." Bit N of the write pointer in timing diagram 1300b of FIG. 13, the source of "WPSync0[N] D," changes from '0' to '1'.

The WPSync0[N] flop Q output is shown going metastable after $T_R$ because its hold time was violated. Its D input changed a little less than its hold time after the rising edge of rclk. Although this metastability may resolve to either '1' or '0', FIG. 13 shows it resolving to '1', which is the value on the D input after the transition. Being resolved this way results in a shortest possible launch-to-capture interval, which occurs in a worst-case scenario. One way to quantify this violation of the WPSync0[N] flop hold time is to define a variable "δ" (delta) which represents a number very close to zero. The difference between the arrival of the edge at the D input pin and the rise of the clock input pin, can then be defined as:

$$T_{1D} - T_{1C} = t_H - \delta \qquad \text{Eq 2}$$

Figure 19:
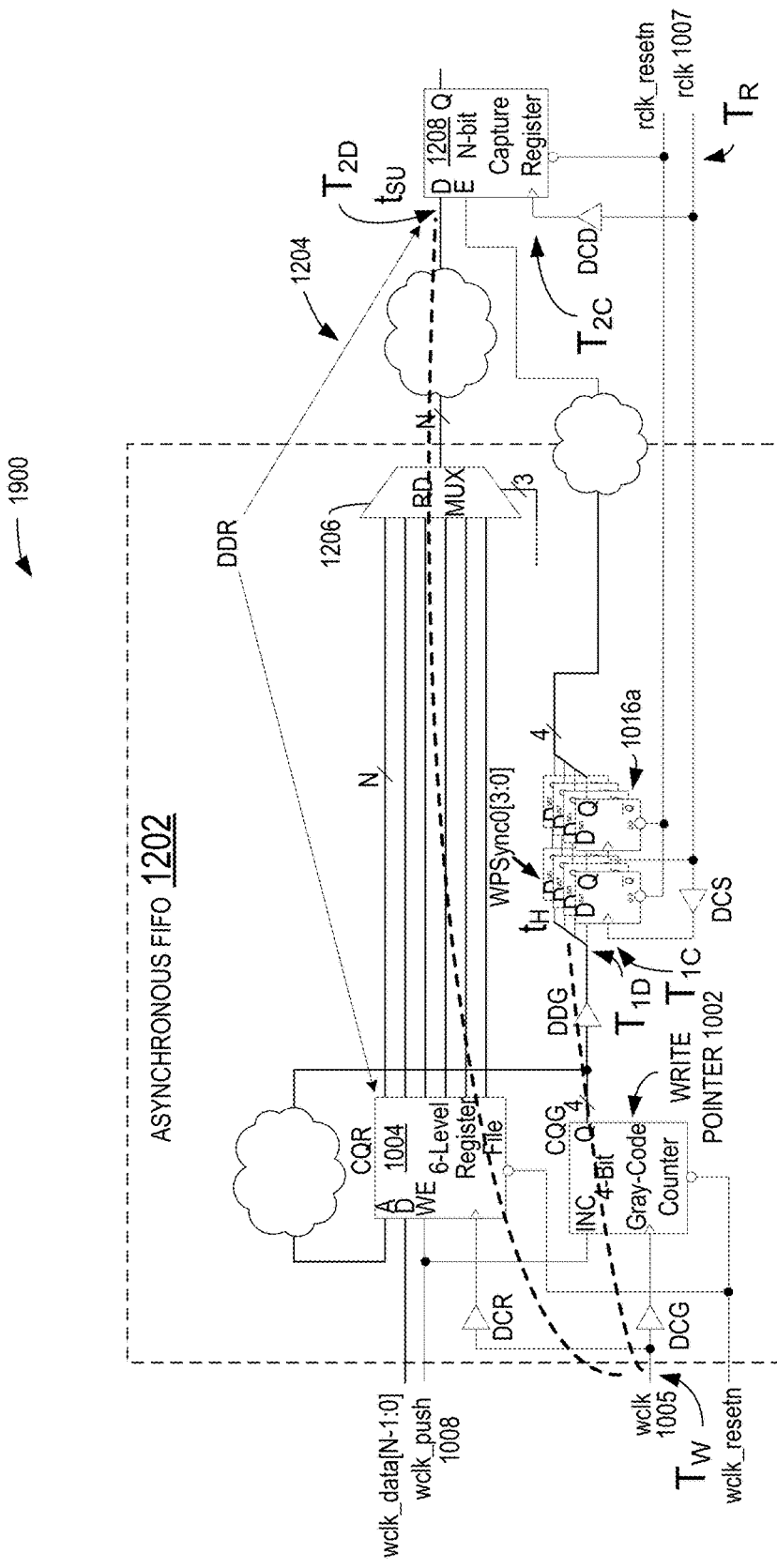
FIG. 19 shows the asynchronous FIFO circuit of FIG. 12 including additional timing indicators.

This equation constrains the momentary phase relationship between rclk and wclk so that it follows the worst-case scenario. FIG. 19 shows a bridge circuit 1900, which includes components of the bridge circuit represented by diagram 1200 of FIG. 12, and an illustration of $T_W$, $T_{1D}$, $T_{1C}$, $T_{2D}$, and $T_{2C}$. Here $T_{1D}$ represents the absolute time at which the D input pin on WPSync0[N] changes. $T_{1C}$ represents the absolute time at which the clock input pin of WPSync0[N] rises.

$T_{1D}$ can be derived from $T_W$ and path delays as follows:

$$T_{1D} = T_W + DCG + CQG + DDG$$

$T_{1C}$ can be derived from $T_R$ and the insertion delay as follows:

$$T_{1C} = T_R + DCS$$

After making the above substitutions, Eq 2 becomes:

$$(T_W + DCG + CQG + DDG) - (T_R + DCS) = t_H - \delta \qquad \text{Eq 3}$$

The change on the register file flop outputs is launched by the rising edge of wclk at time $T_W$ and must reach the D input pins of the capture register early enough to meet its setup time:

$$T_{2C} - T_{2D} > t_{SU} \qquad \text{Eq 4}$$

Here, $T_{2D}$ and $T_{2C}$ (also shown in FIG. 19) represent the absolute time of the arrival of this data at the capture register D input and the absolute time of the rising edge of its clock input pin.

As FIG. 13 illustrates, the rising edge of rclk that triggers the capture register to sample the FIFO output, occurs 2 cycles after $T_R$:

$$T_R + 2*T_{RCYC}$$

Here the cycle time of rclk is represented by "$T_{RCYC}$." $T_{2C}$ can be derived from the above edge and an insertion delay as follows:

$$T_{2C} = T_R + 2*T_{RCYC} + DCD$$

$T_{2D}$ can be derived from $T_W$ and path delays as follows:

$$T_{2D} = T_W + DCR + CQR + DDR$$

After making the above substitutions, Eq 4 becomes:

$$(T_R + 2*T_{RCYC} + DCD) - (T_W + DCR + CQR + DDR) > t_{SU} \qquad \text{Eq 5}$$

Here "$t_{SU}$" represents the setup time of the capture register. If Eq 3 and Eq 5 are added together, the $T_R$ and $T_W$ terms drop out:

$$(T_R + 2*T_{RCYC} + DCD) - (T_W + DCR + CQR + DDR) + (T_W + DCG + CQG + DDG) - (T_R + DCS) > t_{SU} + t_H - \delta \qquad 1)$$

$$T_R - T_R + 2*T_{RCYC} + DCD - T_W + T_W - DCR - CQR - DDR + DCG + CQG + DDG - DCS > t_{SU} + t_H - \delta \qquad 2)$$

$$2*T_{RCYC} - t_{SU} - t_H + DCD - DCS + \delta > (DCR + CQR + DDR) - (DCG + CQG + DDG) \qquad 3)$$

$$(DCR + CQR + DDR) - (DCG + CQG + DDG) < 2*T_{RCYC} - t_{SU} - t_H + DCD - DCS + \delta \qquad 4)$$

$$(DCR + CQR + DDR) - (DCG + CQG + DDG) \leq 2*T_{RCYC} - t_{SU} - t_H - (DCS - DCD) \qquad 5)$$

The same substitutions made above are shown again here:
Let: RclkSkew=DCS−DCD
Let: DataTravel=(DCR+CQR+DDR)−(DCG+CQG+DDG)

$$\text{DataTravel} \leq 2*T_{RCYC} - t_{SU} - t_H - \text{RclkSkew}$$

The sum "DCR+CQR+DDR" actually includes multiple paths, not just one. This is true of "DCG+CQG+DDG", "DCD" and "DCS" also. To more accurately calculate the STA constraint a "max( )" function may be applied which returns the maximum path in a group passed to it, and a "min( )" function which returns the minimum path. The STA constraint then becomes:

$$\max(DCR+CQR+DDR) - \min(DCG+CQG+DDG) \leq 2*T_{RCYC} - \max(t_{SU}) - \max(t_H) + \min(DCD) - \max(DCS).$$

Derivation of the Asynchronous FIFO Gray Code Skew Constraint

Referring back to FIGS. 14 and 15, as well as Table 5 to define variables presented below, a single rising edge on rclk triggers WPSync0[0] and WPSync0[1] to sample changing D inputs causing both to become metastable when the interval of time between the edges is less than the sum of the setup time of WPSync0[0] and the hold time of WPSync0[1]. FIG. 15 illustrates this metastability in timing diagram 1500. For this worst-case scenario to occur, the momentary phase relationship between wclk and rclk is configured to be such that the rising edge of rclk occurs as shown in FIG. 15.

The absolute time at which the rising edge of wclk occurs which triggers gray-code counter bit 0 to change may be referred to as "$T_W$." The absolute time at which the rising edge of rclk occurs which triggers the sampling of the WPSync0[1:0] flip-flops may be referred to as "$T_R$."

In order to maintain the rclk/wclk phase relationship shown in FIG. 15, one of the D-input edges is assumed to be fixed. In other words, either the edge at the D input pin to WPSync0[0] is assumed to arrive just inside the setup time before the clock edge, or the edge at the D-input pin of WPSync0[1] is assumed to arrive just inside a hold time after the clock edge. Only one must be chosen, but it can be either since the final constraint will be the same.

As such, the following example calculations assume that the WPSync[0] D-input edge is fixed. This defines the momentary phase relationship, and means that the edge arrives a little bit less than a setup time before the rising edge of rclk. A way to represent this is to define a variable "δ" (delta) which represents a number very close to zero:

$$T_{1C} - T_{1D} = t_{SU0} - \delta \qquad \text{Eq 6}$$

Figure 20:
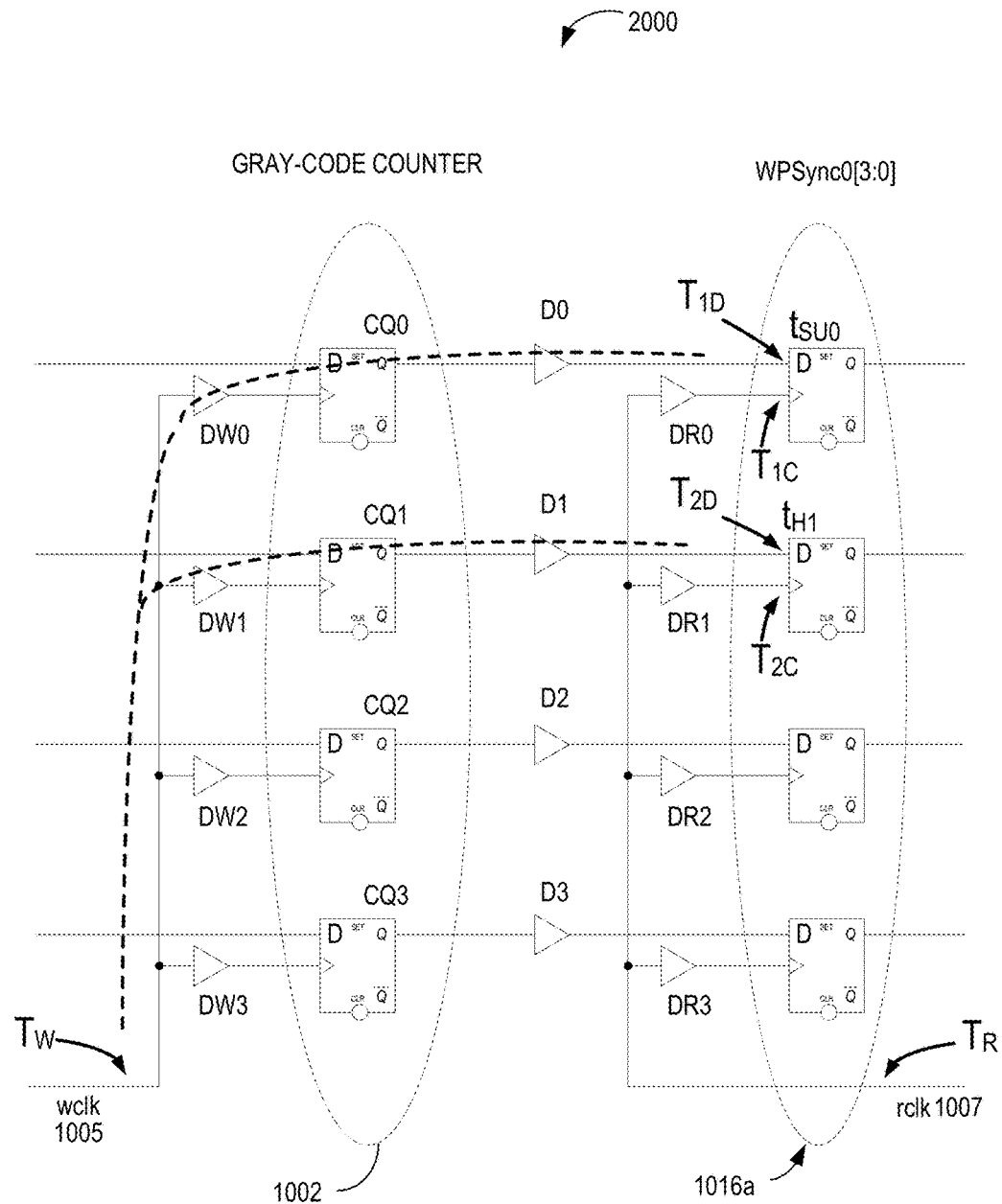
FIG. 20 shows a detailed view of the write pointer gray-code counter and first layer of synchronization flip-flops of FIG. 10.

$T_{1C}$ and $T_{1D}$ and are shown in FIG. 20, which shows a more detailed view 2000 of the write pointer gray-code counter 1002 and first layer (WPSync0[3:0]) of synchronization flip-flops from FIG. 10, as well as timing parameters $T_W$, $T_R$, $T_{1C}$, and $T_{1D}$. $T_{1C}$ and $T_{1D}$ represent the absolute time at which the toggle edge of gray-code-counter bit 0 arrives at the D input pin of the WPSync0[0] flip-flop and the absolute time at which its clock input rises.

$T_{1D}$ can be derived from $T_W$ and path delays as follows:

$$T_{1D} = T_W + DW0 + CQ0 + D0$$

$T_{1C}$ can be derived from $T_R$ and an insertion delay as follows:

$$T_{1C} = T_R + DR0$$

With the above substitutions made, Eq expands to the following:

$$(T_R + DR0) - (T_W + DW0 + CQ0 + D0) = t_{SU0} - \delta, \qquad \text{Eq 7}$$

noting that signal delay paths and clock skew are to be constrained such that no more than one of the WPSync0 flip-flops can go metastable for one rclk rising edge. The WPSync[0] flop goes metastable assuming the momentary phase relationship defined above. In order to prevent the WPSync0[1] flop from also going metastable, its D input pin is expected to change greater than an interval of time (after the rising edge) equal to the flop's hold time:

$$T_{2D} - T_{2C} > t_{H1} \qquad \text{Eq 8}$$

$T_{2D}$ and $T_{2C}$ and are shown in FIG. 20 and represent the absolute time at which the toggle edge of gray-code-counter bit 1 arrives at the D input pin of the WPSync0[1] flip-flop and the absolute time at which its clock input rises.

The absolute time at which the rising edge of wclk occurs that triggers the gray-code counter bit 1 to change is one wclk cycle after $T_W$, as follows.

$$T_W + T_{WCYC}$$

$T_{2D}$ may be derived from the above edge time and related path delays as follows.

$$T_{2D} = T_W + T_{WCYC} + DW1 + CQ1 + D1$$

$T_{2C}$ may be derived from $T_R$ and an insertion delay as follows.

$$T_{2C} = T_R + DR1$$

With the above substitutions made, Eq 8 expands to the following.

$$(T_W + T_{WCYC} + DW1 + CQ1 + D1) - (T_R + DR1) > t_{H1} \qquad \text{Eq 9}$$

Adding the equation (Eq 7) to the inequality (Eq 9) results in the $T_W$ and $T_R$ terms cancelling out.

$$(T_W + T_{WCYC} + DW1 + CQ1 + D1) - (T_R + DR1) + (T_R + DR0) - (T_W + DW0 + CQ0 + D0) > t_{H1} + t_{SU0} - \delta \qquad 1)$$

$$T_W - T_W + T_R - T_R + T_{WCYC} + (DW1 + CQ1 + D1) - DR1 + DR0 - (DW0 + CQ0 + D0) > t_{H1} + t_{SU0} - \delta \qquad 2)$$

$$(DW1 + CQ1 + D1) - (DW0 + CQ0 + D0) + (DR0 - DR1) > -T_{WCYC} + t_{H1} + t_{SU0} - \delta \qquad 3)$$

$$(DW0 + CQ0 + D0) - (DW1 + CQ1 + D1) < T_{WCYC} - t_{H1} - t_{SU0} + DR0 - DR1 + \delta \qquad 4)$$

$$(DW0 + CQ0 + D0) - (DW1 + CQ1 + D1) \leq T_{WCYC} - t_{H1} - t_{SU0} - (DR1 - DR0) \qquad 5)$$

As described above, the following substitutions may be made:

Let: RCLKSkew10=DR1−DR0
Let: SignalSkew01=(DW0+CQ0+D0)−(DW1+CQ1+D1)
The constraint then becomes the following.

$$\text{SignalSkew01} \leq T_{WCYC} - t_{SU0} - t_{H1} - \text{RCLKSkew10}$$

With all combinations considered:

$$\text{SignalSkew12} \leq T_{WCYC} - t_{SU1} - t_{H2} - \text{RCLKSkew21}$$

$$\text{SignalSkew23} \leq T_{WCYC} - t_{SU2} - t_{H3} - \text{RCLKSkew32}$$

$$\text{SignalSkew30} \leq T_{WCYC} - t_{SU3} - t_{H0} - \text{RCLKSkew03}$$

$$\text{SignalSkew}MN \leq T_{WCYC} - t_{SUM} - t_{HN} - \text{RCLKSkew}NM$$

The above covers STA constraints for signal skew in the logic that synchronizes the write pointer over to the rclk domain. The logic that synchronizes the read pointer over to the wclk domain may is also to be constrained.

$$\text{SignalSkew}MN \leq T_{RCYC} - t_{SUM} - t_{HN} - \text{WCLKSkew}NM$$

The above constraint looks the same as above-identified constraints, except that parameters in this constraint represent delays associated with the read pointer instead of the write pointer.

Derivation of the Round-Trip Time STA Constraints

Referring back to FIG. 16, as well as Table 5 to define variables presented below, gray-code counters and associated synchronizers for the write and read pointers in FIG. 10 are illustrated, with buffers added and parameters for post-layout delays annotated throughout the diagram. FIG. 10 is the block diagram of an example economical implementation of an asynchronous FIFO, which includes 2 layers of synchronization for each gray-code counter. FIG. 17 is also referenced, which shows timing for a scenario where the FIFO starts out empty, then a continuous burst of data is pushed in from the wclk side while data is popped out in a continuous burst on the rclk side.

Performance is only of concern when the frequencies of wclk and rclk are the same or very close. The longest round-trip time occurs when the alignment of rclk is such that the edge of the changing gray-code write pointer bit "N" arrives at WPSync0[N] a little bit less than a setup time before the rising edge of rclk.

The absolute time at which the rising edge of wclk occurs which triggers gray-code counter bit N to change can be called "$T_W$." The absolute time at which the rising edge of rclk occurs which triggers the sampling of that bit by the WPSync0[N] flip-flop can be called "$T_R$."

The toggle edge of gray-code counter bit N arrives at the D input pin of the WPSync0[N] flip-flop at the following time.

$$T_W + DCG + CQG + DDG$$

The clock input pin to the WPSync0[N] flip-flop rises at the following time.

$$T_R + DCS$$

The clock input pin of WPSync0[N] rises a little less than the flop's setup time after the change on its D input pin. One way to represent this is to define a variable "δ" (delta) which represents a number very close to zero.

$$(T_R + DCS) - (T_W + DCG + CQG + DDG) = t_{SUM} - \delta \qquad \text{Eq 10}$$

Eq 10 above defines a momentary phase relationship between wclk and rclk which results in the worst-case (maximum) round-trip time (RTT). Since the flop's setup time is violated, it goes metastable. Contributing to this worst-case situation, this metastability is resolved as the value before the change. This delays the edge by an entire clock plus setup time.

Three cycles after the above-referenced $T_R$ clock edge, the read pointer gray-code counter increments causing its bit M to toggle, bit M being the only bit that does toggle in this particular increment. The absolute time at which this edge rises is defined as follows.

$$T_R + 3 * T_{RCYC}$$

Bit M from the read pointer must be correctly sampled by the fourth rising edge of wclk after $T_W$ in order to prevent the wclk_level[2:0] from reaching 6 and causing the wclk_full to become asserted. This occurs at the following absolute time.

$$T_W + 4 * T_{WCYC}$$

The read pointer bit M change reaches the RPSync0[M] D input pin at the following time.

$$T_R + 3 * T_{RCYC} + DCA + CQA + DDA$$

The clock input pin to the RPSync0[M] flop rises at the following time.

$$T_W + 4 * T_{WCYC} + DCT$$

The setup time for the RPSync0[M] flop must be met in order to guarantee that the change is able to prevent wclk_level[2:0] from reaching 6.

$$(T_W + 4 * T_{WCYC} + DCT) - (T_R + 3 * T_{RCYC} + DCA + CQA + DDA) > t_{SUR}$$

Since $T_{WCYC} = T_{RCYC} = T_{CYC}$, the above inequality may be simplified as follows.

$$(T_W + T_{CYC} + DCT) - (T_R + DCA + CQA + DDA) > t_{SUR} \qquad \text{Eq 11}$$

By adding Eq 10 to the inequality above (Eq 11), the absolute time terms may be eliminated.

$$(T_W + T_{CYC} + DCT) - (T_R + DCA + CQA + DDA) + (T_R + DCS) - (T_W + DCG + CQG + DDG) > t_{SUR} + t_{SUM} - \delta \qquad 1)$$

$$(T_W - T_W) + (T_R - T_R) + DCT - (DCA + CQA + DDA) + DCS - (DCG + CQG + DDG) - t_{SUR} - t_{SUM} > -T_{CYC} - \delta \qquad 2)$$

$$(DCG + CQG + DDG + t_{SUW}) - DCT + (DCA + CQA + DDA + t_{SUR}) - DCS < T_{CYC} + \delta \qquad 3)$$

$$(DCG + CQG + DDG + t_{SUW}) - DCT + (DCA + CQA + DDA + t_{SUR}) - DCS \leq T_{CYC} \qquad 4)$$

The resulting STA constraint is therefore:

$$DCG + CQG + DDG + t_{SUW}) - DCT + (DCA + CQA + DDA + t_{SUR}) - DCS \leq T_{CYC} \qquad \text{Eq 12}$$

The terms in the above constraint may include multiple paths, not just one. To more accurately calculate the STA constraint a "max( )" function may be applied, which returns the maximum path in a group passed to it, and a "min( )" function may be applied, which returns the minimum path.

$$\max(DCG + CQG + DDG + T_{SUW}) - \min(DCT) + \max(DCA + CQA + DDA + t_{SUR}) - \min(DCS) \leq T_{CYC}$$

Derivation of the Data Bus Bridge STA Constraints

Figure 21:
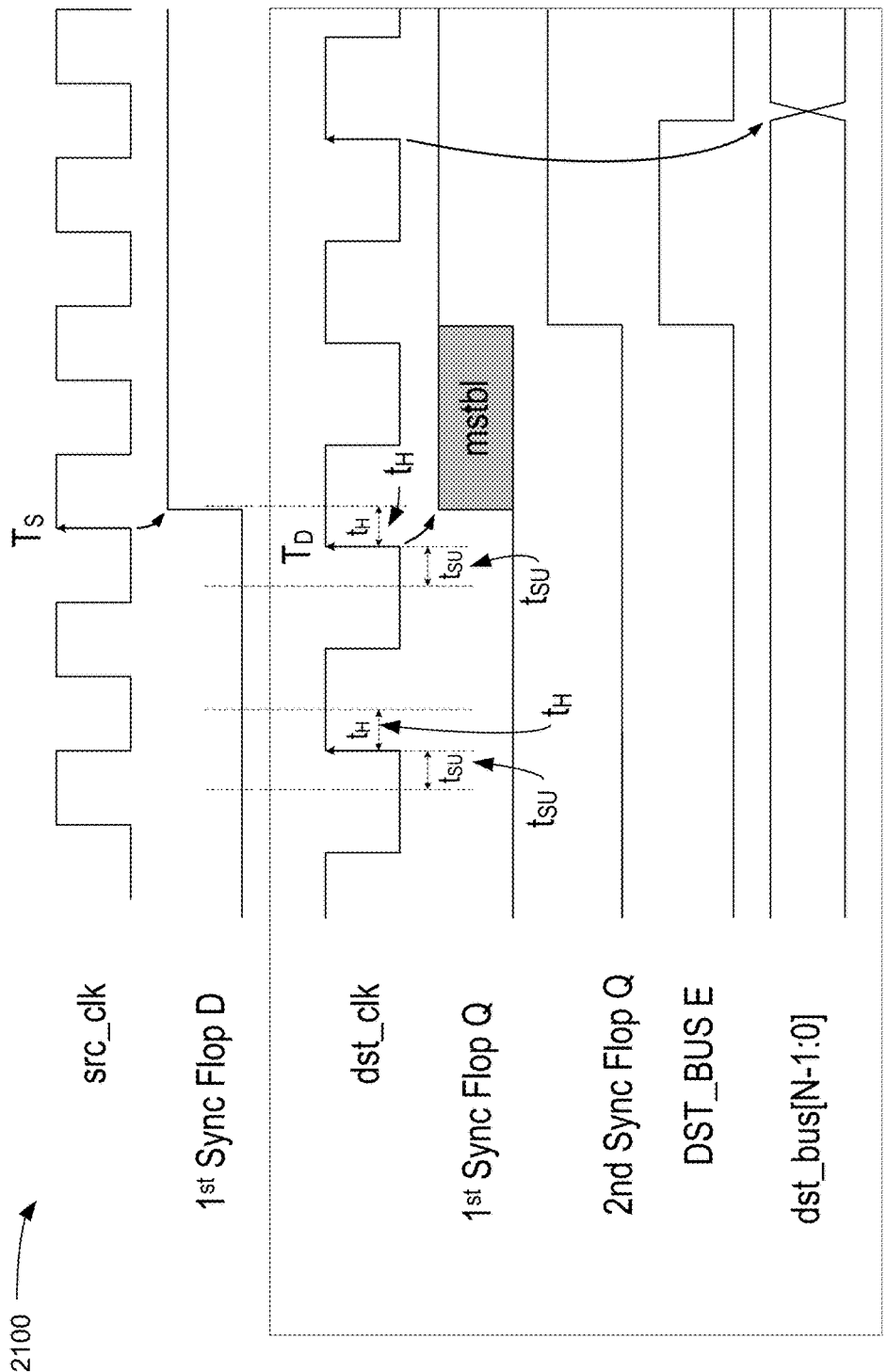
FIG. 21 shows the timing diagram of FIG. 5 including additional timing indicators.

Referring back to FIG. 4, as well as Table 1 to define variables presented below, Data Bus Bridge (DDB) 400 illustrates a one-way DBB with synchronization flip-flops and buffers indicating delays in the circuit. FIG. 21 illustrates a timing diagram 2100, which represents the timing diagram 500b of FIG. 5 (an example timing diagram for signals from components of DBB 400 of FIG. 4), with additional timing indicating thereon.

In particular, the absolute time at which the rising edge of src_clk occurs which triggers the BYS_SYNC to sample src_bus data and the toggle flip-flop to toggle is referred to as "$T_S$" in FIG. 21. The absolute time at which the rising edge of dst_clk occurs which triggers the first synchronization flip-flop to sample the output of the toggle flip-flop is referred to as "$T_D$" in FIG. 21.

The toggle edge will arrive at the D input pin to the first synchronization flip-flop at the following time.

$$T_S + DCG + CQG + DDG$$

The clock input pin to the first synchronization flip-flop will rise at the following time.

$$T_D + DCS$$

The latest possible point in time where the flop will go metastable is a little bit less than an interval of time (after this rising edge) equal to the flop's hold time. One way to represent this is to define a variable "δ" (delta) which represents a number very close to zero. The difference between the arrival of the edge at the D input and the rise of the clock input as defined above, may then be defined as follows.

$$(T_S + DCG + CQG + DDG) - (T_D + DCS) = t_H - \delta \qquad \text{Eq 13}$$

As FIG. 21 illustrates, the rising edge of dst_clk that triggers the BUS_SYNC register output to be sampled by the DST_BUS register occurs 2 cycles after $T_D$. This may be represented as follows.

$$T_D + 2 * T_{DCYC}$$

Here the cycle time of dst_clk is represented by "$T_{DCYC}$." The absolute time at which the clock input pin to the DST_BUS register rises may be represented as follows.

$$T_D + 2 * T_{DCYC} + DCD$$

The change on the SYNC_BUS register is launched by the rising edge of src_clk at time $T_S$ and must reach the D input of the DST_BUS register early enough to meet its setup time.

$$(T_D + 2 * T_{DCYC} + DCD) - (T_S + DCR + CQR + DDR) > t_{SU} \qquad \text{Eq 14}$$

Here "$t_{SU}$" represents the setup time of the SYNC_BUS register. If Eq 13 and Eq 14 are added together, the $T_D$ and $T_S$ terms drop out.

$$(T_D + 2 * T_{DCYC} + DCD) - (T_S + DCR + CQR + DDR) + (T_S + DCG + CQG + DDG) - (T_D + DCS) > T_{SU} + t_H - \delta \qquad 1)$$

$$T_D - T_D + 2*T_{DCYC} + DCD - T_S + T_S - DCR - CQR - DDR + DCG + CQG + DDG - DCS > t_{SU} + t_H - \delta \quad \quad 2)$$

$$2*T_{DCYC} - t_{SU} - t_H + DCD - DCS + \delta > (DCR + CQR + DDR) - (DCG + CQG + DDG) \quad \quad 3)$$

$$(DCR + CQR + DDR) - (DCG + CQG + DDG) < 2*T_{DCYC} - t_{SU} - t_H + DCD - DCS + \delta \quad \quad 4)$$

$$(DCR + CQR + DDR) - (DCG + CQG + DDG) \le 2*T_{DCYC} - t_{SU} - t_H - (DCS - DCD) \quad \quad 5)$$

The same substitutions described above are shown again here:

Let: DstClkSkew=DCS−DCD
Let: DataTravel=(DCR+CQR+DDR)−(DCG+CQG+DDG)

$$\text{DataTravel} \le 2*T_{DCYC} - t_{SU} - t_H - \text{DstClkSkew}$$

Note that this constraint is nearly identical to the data path constraint for the Asynchronous FIFO derived above.

The sum "DCR+CQR+DDR" may include multiple paths, rather than a single one. This is true of "DCD" also. To more accurately calculate the STA constraint, a "max( )" function may be applied, which returns the maximum path in a group passed to it, and a "min( )" function may be applied, which returns the minimum path:

$$\max(DCR+CQR+DDR) - (DCG+CQG+DDG) \le 2*T_{DCYC} - t_{SU} - t_H + \min(DCD) - DCS$$

Round-Trip Time STA Constraints when Frequencies Differ

The assumption here is that $T_{RCYC} \ne T_{WCYC}$. As presented above, Eq 10 may be used for this scenario. The setup time for RPSync0[M] must be met in order to guarantee that the change is able to prevent wclk_level[2:0] from reaching 6.

$$(T_W + 4*T_{WCYC} + DCT) - (T_R + 3*T_{RCYC} + DCA + CQA + DDA) > t_{SUR}$$

The difference in cycle times may be defined as follows.

$$T_\Delta = |T_{WCYC} - T_{RCYC}|$$

The slower frequency (larger cycle time) may be defined as follows.

$$T_{XCYC} = \max(T_{WCYC}, T_{RCYC})$$

The first inequality above assumes the scenario where the FIFO is initially empty when a burst of push cycles begins, so the push side of the FIFO would not be held up if the wclk frequency is slower than the rclk frequency. Therefore the following assumption can be made.

$$T_{XCYC} = T_{WCYC}$$

From this $T_{RCYC}$ can be derived.

$$T_{RCYC} = T_{XCYC} - T_\Delta$$

Substituting back in to the first constraint produces $$(T_W + 4*T_{XCYC} + DCT) - (T_R + 3*(T_{XCYC} - T_\Delta) + DCA + CQA + DDA) > t_{SUR}$$

which reduces to the following.

$$(T_W + T_{XCYC} + DCT) - (T_R - 3*T_\Delta + DCA + CQA + DDA) > t_{SUR}$$

By adding Eq 10 to the inequality above, the absolute time terms can be eliminated.

$$(T_W + T_{XCYC} + DCT) - (T_R - 3*T_\Delta + DCA + CQA + DDA) + (T_R + DCS) - (T_W + DCG + CQG + DDG) > t_{SUR} + t_{SUW} - \delta \quad \quad 1)$$

$$(T_W - T_W) + (T_R - T_R) + DCT - (DCA + CQA + DDA) + DCS - (DCG + CQG + DDG) - t_{SUR} - t_{SUW} > -T_{XCYC} - 3*T_\Delta - \delta \quad \quad 2)$$

$$(DCG + CQG + DDG + t_{SUW}) - DCT + (DCA + CQA + DDA + t_{SUR}) - DCS < T_{XCYC} + 3*T_\Delta + \delta \quad \quad 3)$$

$$(DCG + CQG + DDG + t_{SUW}) - DCT + (DCA + CQA + DDA + t_{SUR}) - DCS \le T_{XCYC} + 3*T_\Delta \quad \quad 4)$$

The resulting STA constraint is therefore.

$$(DCG + CQG + DDG + t_{SUW}) - DCT + (DCA + CQA + DDA + t_{SUR}) - DCS \le T_{XCYC} + 3*T_\Delta$$

In other words the Eq 12 constraint changes such that the cycle time is larger and a term on the right-hand side is added, both of which make it easier to meet.

Figure 22:
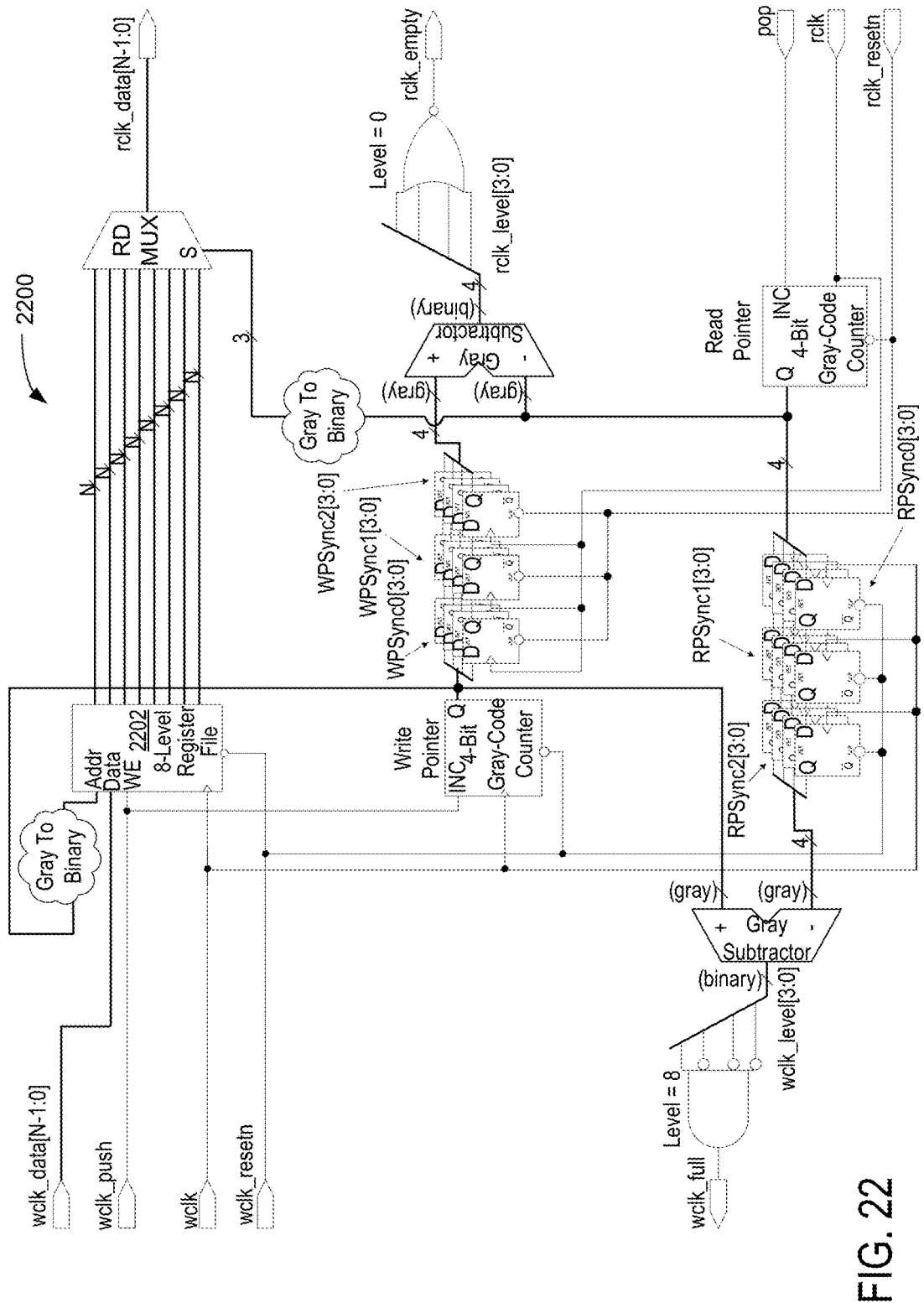
FIG. 22 shows a diagram of another example embodiment of an asynchronous FIFO.

A variation of the asynchronous architecture described above is illustrated in FIG. 22. Asynchronous FIFO 2200 includes three layers of flip-flops to synchronize the gray-code pointers to the opposite clock domains (e.g., WPSync0-WPSync2), while the Asynchronous FIFO shown in FIG. 10 has only two layers (e.g., WPSync0 and WPSync1). The additional layers in FIFO 2200 provides more settling time for the delay path that exists between the register file and the register that captures the data from the rclk_data[N−1:0] bus in the downstream device. The round-trip time is 8 clocks when the frequencies of the two clocks (e.g., wclk and rclk) are close or the same. The FIFO 2200 is therefore configured to have a depth of 8 in order to prevent loss of performance due to traffic-flow interruptions. This is shown implemented in the figure as an 8-level register file 2202, along with 4-bit FIFO level signals where "8" represents "full" on the wclk side.

The round-trip time of 8 assumes the path delays between the domains add up to less than one clock. The extra layer of synchronization affects cross-domain STA. The pulse high on the capture register E input pin occurs one clock after the one shown in FIG. 13. This provides an extra clock to the DataTravel interval:

$$\text{DataTravel} < 3*T_{RCYC} - t_{SU} - t_H - \text{RclkSkew}$$

However, the gray-code counter signal-skew constraints are the same for all variations of the Asynchronous FIFO since the same paths exist between the gray-code counters and the first layer of synchronization flip-flops:

$$\text{SignalSkew}MN \le T_{WCYC} - t_{SUM} - t_{HN} - \text{RCLKSkew}NM$$

$$\text{SignalSkew}MN \le T_{RCYC} - t_{SUM} - t_{HN} - \text{WCLKSkew}NM$$

Also, the same constraint defined in Eq 1 above is to be met for performance and RTT:

$$(DCG + CQG + DDG + t_{SUW}) - DCT + (DCA + CQA + DDA + t_{SUR}) - DCS \le T_{CYC}$$

Adding synchronization layers does not change this constraint as long as the FIFO depth matches the round-trip time.

The derivation of the cross-domain STA constraint for the data path of FIFO 2200 is described below. The pulse high on the capture register E input pin occurs one clock after the one shown in FIG. 13. As a result, the rising edge of rclk that triggers the FIFO output to be sampled by the capture register occurs 3 cycles after $T_R$. The above may be represented as follows.

$$T_R + 3*T_{RCYC}$$

The absolute time at which the clock input pin to the capture register rises may be represented as follows.

$$T_R + 3*T_{RCYC} + DCD$$

The register file to capture register constraint is therefore calculated as follows.

$$(T_R+3*T_{RCYC}+DCD)-(T_W+DCR+CQR+DDR) \geq t_{SU}$$

This leads to a final constraint, as follows.

$$(DCR+CQR+DDR)-(DCG+CQG+DDG) \leq 3*T_{RCYC}-t_{SU}-t_H-(DCS-DCD)$$

Making the same substitutions as shown above leads to this simplified constraint.

$$DataTravel \leq 3*T_{RCYC}-t_{SU}-t_H-RclkSkew$$

The STA constraint for FIFO 2200 becomes the following.

$$\max(DCR+CQR+DDR)-\min(DCG+CQG+DDG) \leq 3*T_{RCYC}-t_{SU}-t_H+\min(DCD)-\max(DCS)$$

For FIFO 2200, the read pointer bit M change reaches the RPSync0[M] D input pin at a later point in time.

$$T_R+4*T_{RCYC}+DCA+CQA+DDA$$

FIFO 2200 also has a later parameter for the point in time when the clock input pin to the RPSync0[M] flop rises.

$$T_W+5*T_{WCYC}+DCT$$

The setup time parameter for the RPSync0[M] flop is therefore as follows.

$$(T_W+5*T_{WCYC}+DCT)-(T_R+4*T_{RCYC}+DCA+CQA+DDA) \geq t_{SUR}$$

Substituting $T_{WCYC}=T_{RCYC}=T_{CYC}$ and reducing the terms reveals the same inequality derived above in Eq 11.

$$(T_W+T_{CYC}+DCT)-(T_R+DCA+CQA+DDA) \geq t_{SUR}$$

So the STA constraint for FIFO 2200 is the same as the original shown in FIG. 10.

$$(DCG+CQG+DDG+t_{SUW})-DCT+(DCA+CQA+DDA+t_{SUR})-DCS \leq T_{CYC}$$

Figure 23:
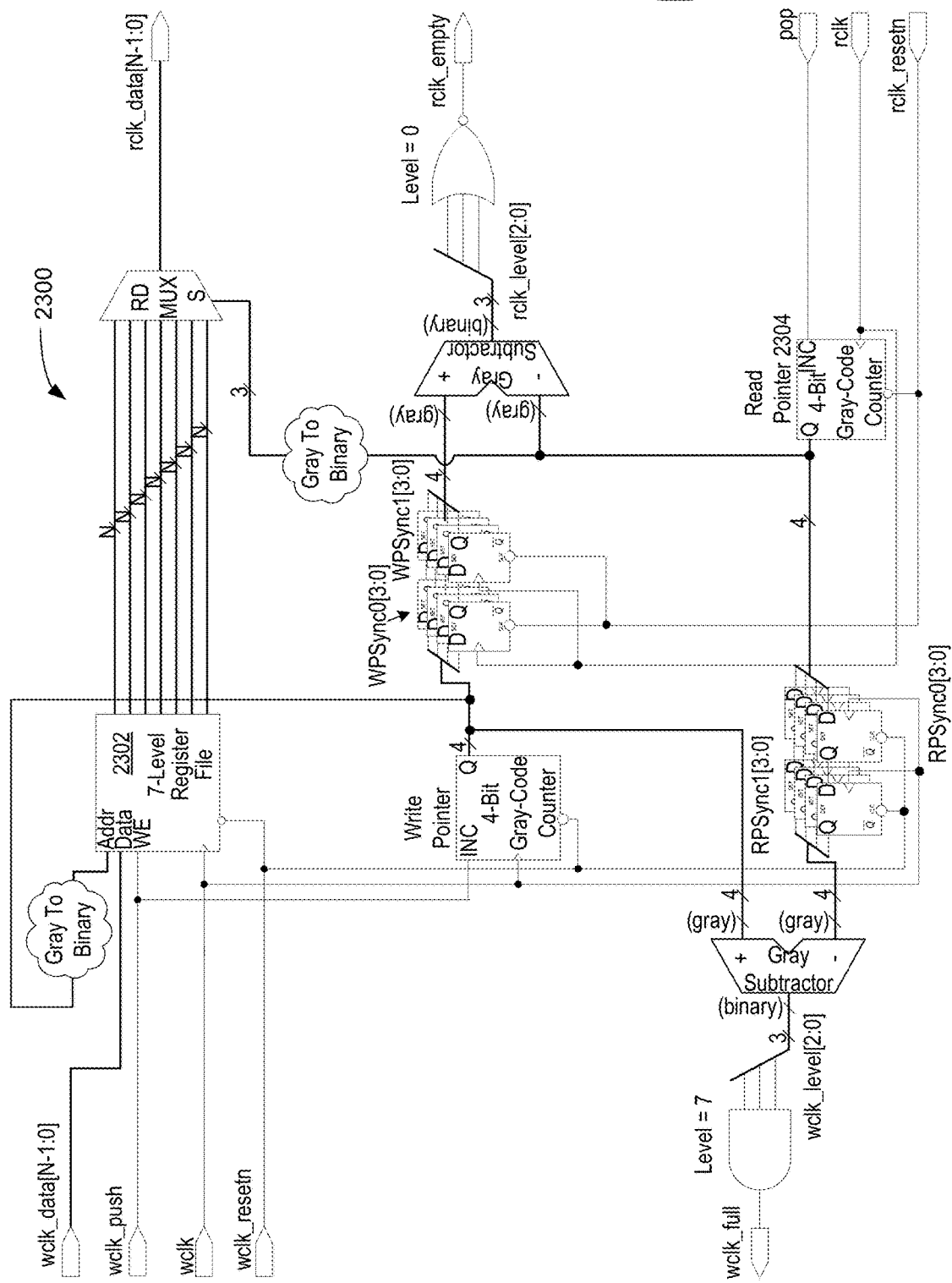
FIG. 23 shows a diagram of still another example embodiment of an asynchronous FIFO.

Still another variant of the asynchronous FIFO is shown in FIG. 23. FIFO 2300 includes two layers of synchronization flip-flops (e.g., WPSync0 and WPSync1) just like the one shown in FIG. 10, but has a FIFO depth of 7 with a 7-level register file 2302. The architecture illustrated in FIG. 23 may be used to prevent interruption of traffic flow in the case where the round-trip time exceeds 6 clocks due to excessive path delays between the clock domains. If the path delay between the gray-code counters and their synchronization flip-flops adds up to more than a clock but does not exceed 2 clocks, then the round-trip time will be 7 clocks.

The data path STA is no different than the one governing the original Asynchronous FIFO 1000 shown in FIG. 10.

$$DataTravel < 2*T_{RCYC}-t_{SU}-t_H-RclkSkew$$

This is because it has the same number of gray-code synchronization layers. Also, the gray-code counter signal-skew constraints are the same for all variations of the Asynchronous FIFO since the same paths exist between the gray-code counters and the first layer of synchronization flip-flops.

$$SignalSkewMN \leq T_{WCYC}-t_{SUM}-t_{HN}-RCLKSkewMN$$

$$SignalSkewMN \leq T_{RCYC}-t_{SUM}-t_{HN}-WCLKSkewMN$$

Introducing more levels into the FIFO depth beyond the round-trip time does however affect cross-domain RTT static timing and makes it easier to meet. The full RTT STA constraint is defined as follows.

$$(DCG+CQG+DDG+t_{SUW})-DCT+(DCA+CQA+DDA+t_{SUR})-DCS \leq 2*T_{CYC}$$

In fact, for "K" levels and the same 2-layers of synchronization, the constraint becomes the following.

Let: J=K−5

$$(DCG+CQG+DDG+t_{SUW})-DCT+(DCA+CQA+DDA+t_{SUR})-DCS \leq J*T_{CYC}$$

Asynchronous FIFO 2300 has another clock cycle of margin in the round-trip path. Bit M from the read pointer 2304 may be configured to be sampled by the fifth rising edge of wclk after $T_W$ in order to prevent the wclk_level[2:0] from reaching 7 and causing the wclk_full to become asserted.

$$T_W+5*T_{WCYC}$$

The read pointer 2304 gray-code counter still increments, causing its bit M to toggle, three cycles after the $T_R$ clock edge.

$$T_R+3*T_{RCYC}$$

The read pointer 2304 bit M change therefore reaches the RPSync0[M] D input pin at the following time.

$$T_R+3*T_{RCYC}+DCA+CQA+DDA$$

The clock input pin to the RPSync0[M] flip-flop rises at the following time.

$$T_W+5*T_{WCYC}+DCT$$

The setup time for the RPSync0[M] flip-flop is configured to be met in order to guarantee that the change is able to prevent wclk_level[2:0] from reaching 7.

$$(T_W+5*T_{WCYC}+DCT)-(T_R+3*T_{RCYC}+DCA+CQA+DDA) \geq t_{SUR}$$

Since $T_{WCYC}=T_{RCYC}=T_{CYC}$, the above inequality can be simplified as follows.

$$(T_W+2*T_{CYC}+DCT)-(T_R+DCA+CQA+DDA) > T_{SUR}$$

The resulting STA constraint for FIFO 2300 is therefore as follows.

$$(DCG+CQG+DDG+t_{SUW})-DCT+(DCA+CQA+DDA+t_{SUR})-DCS \leq 2*T_{CYC}$$

In fact, any additional level introduced beyond 6 adds another cycle to the STA constraint. As such, for an asynchronous FIFO with "K" levels and 2-layers of synchronization:

Let: J=K−5

$$(DCG+CQG+DDG+t_{SUW})-DCT+(DCA+CQA+DDA+t_{SUR})-DCS \leq J*T_{CYC}$$

Figure 24:
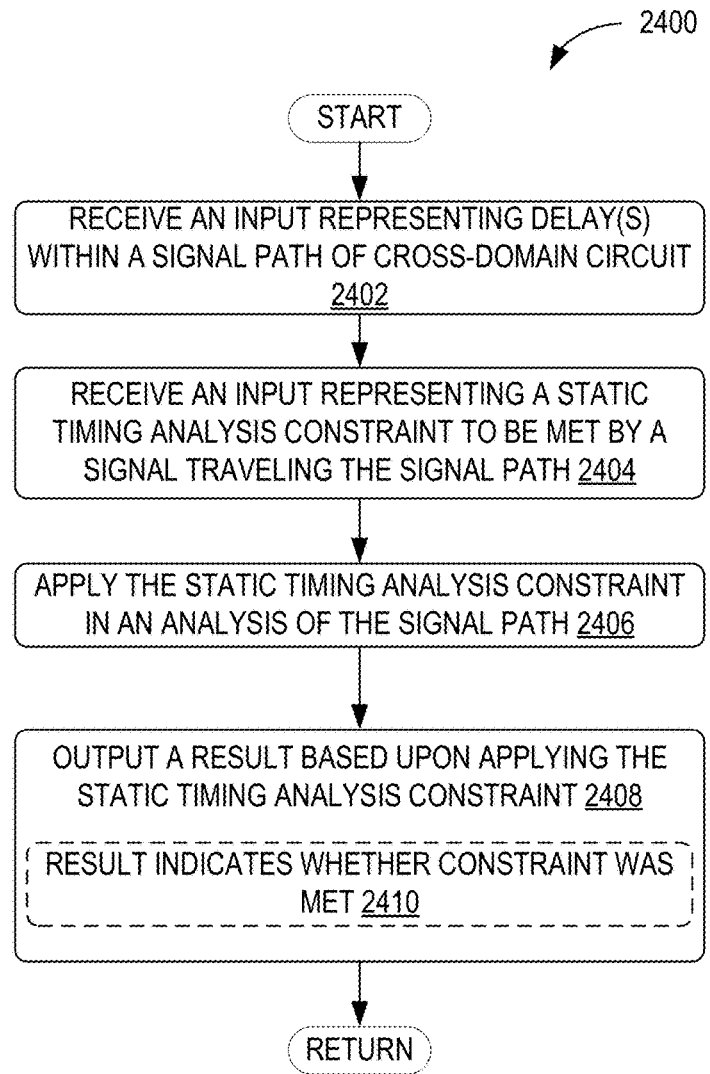
FIG. 24 shows an example method of applying a static timing constraint.

The constraints described above may be utilized in an STA tool to perform STA for circuits that cross clock domains. FIG. 24 shows an example method 2400 of applying and outputting a result of applying a static timing analysis constraint. Method 2400 may be implemented by a computing device, examples of which are described in more detail below. At 2402, method 2400 includes receiving an input representative of one or more delays within a signal path in a cross-domain circuit, the cross-domain circuit configured to transfer data between a first domain having a first clock and a second domain having a second clock asynchronous with the first clock. Further, at 2404, the method includes receiving an input representative of a static timing analysis constraint to be met by a signal traveling the signal path. In some examples, the signal path is a data signal path configured to deliver data for sampling at a destination register, and the static timing analysis constraint is based upon one or more delays in a control signal path configured to control the sampling at the destination register.

Likewise, in some examples, the signal path is a first gray code bit synchronization path for a first gray code pointer bit for a gray code buffer index, and wherein the static timing analysis constraint is based upon one or more delays in a second gray code bit synchronization path for a second gray code pointer bit for the gray code buffer index. In still other examples, the cross-domain circuit is an asynchronous FIFO circuit, wherein the signal path is a round trip synchronization path of a write pointer in the asynchronous FIFO circuit from a write clock input at a write-side address counter to an address subtractor at a read-side of the cross-domain circuit, and wherein the constraint is based on a cycle time of the first clock and a cycle time of the second clock. The static timing analysis constraint may be determined based upon measurements of delays that occur during a momentary phase alignment between the first clock and the second clock, in order to represent a worst-case scenario of delays.

At 2406, the method includes applying the static timing analysis constraint in an analysis of the signal path. At 2408, the method includes outputting a result based upon applying the static timing analysis constraint. As indicated at 2410, the result may indicate (e.g., visually, via a display, audibly, via one or more speakers, etc.) whether the static timing analysis constraint is met (e.g., a passing or failing status—whether the bridge circuit meets timing or not), and also may suggest changes to make to the circuit to meet timing.

The disclosure therefore takes a comprehensive approach to analyzing cross-clock-domain timing paths by evaluating various delay parameters associated with circuits running in separate clock domains. Application of the above-defined constraints may be used in the synthesis and physical design phases of IC development to ensure the cross-clock-domain bridge circuits meet timing, and thus help prevent failure of such bridges in products incorporating the bridges.

In some embodiments, the methods and processes described herein may be tied to a computing system of one or more computing devices. In particular, such methods and processes may be implemented as a computer-application program or service, an application-programming interface (API), a library, and/or other computer-program product.

Figure 25:
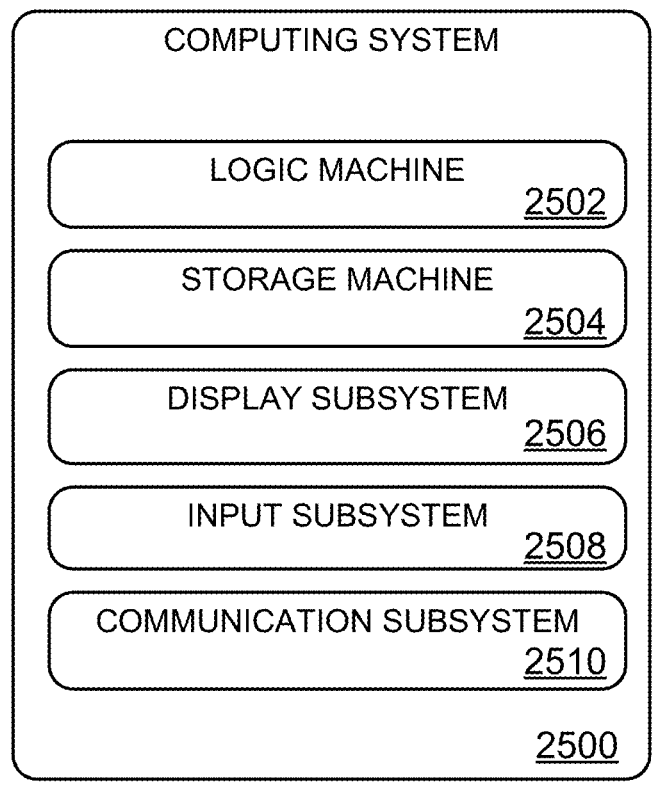
FIG. 25 shows a block diagram of an example computing device.

FIG. 25 schematically shows a non-limiting embodiment of a computing system 2500 that can enact one or more of the methods and processes described above. For example, computing system 2500 may include one or more integrated circuits including one or more of the clock-domain-crossing bridge circuits described above. Computing system 2500 may additionally or alternatively measure such clock-domain-crossing bridge circuits to determine STA constraints and/or apply the STA constraints and output a result of such application. Computing system 2500 is shown in simplified form. Computing system 2500 may take the form of one or more static timing analysis devices, personal computers, server computers, tablet computers, home-entertainment computers, network computing devices, gaming devices, mobile computing devices, mobile communication devices (e.g., smart phone), and/or other computing devices.

Computing system 2500 includes a logic machine 2502 and a storage machine 2504. Computing system 2500 may optionally include a display subsystem 2506, input subsystem 2508, communication subsystem 2510, and/or other components not shown in FIG. 25.

Logic machine 2502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 2504 includes one or more physical devices configured to hold instructions executable by the logic machine to implement the methods and processes described herein. When such methods and processes are implemented, the state of storage machine 2504 may be transformed—e.g., to hold different data.

Storage machine 2504 may include removable and/or built-in devices. Storage machine 2504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 2504 may include volatile, non-volatile, dynamic, static, read/write, read-only, random-access, sequential-access, location-addressable, file-addressable, and/or content-addressable devices.

It will be appreciated that storage machine 2504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 2502 and storage machine 2504 may be integrated together into one or more hardware-logic components. Such hardware-logic components may include field-programmable gate arrays (FPGAs), program-specific and application-specific integrated circuits (PASIC/ASICs), program-specific and application-specific standard products (PSSP/ASSPs), system-on-a-chip (SOC), and complex programmable logic devices (CPLDs), for example.

When included, display subsystem 2506 may be used to present a visual representation of data held by storage machine 2504. This visual representation may take the form of a graphical user interface (GUI). As the herein described methods and processes change the data held by the storage machine, and thus transform the state of the storage machine, the state of display subsystem 2506 may likewise be transformed to visually represent changes in the underlying data. Display subsystem 2506 may include one or more display devices utilizing virtually any type of technology. Such display devices may be combined with logic machine 2502 and/or storage machine 2504 in a shared enclosure, or such display devices may be peripheral display devices.

When included, input subsystem 2508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2510 may be configured to communicatively couple computing system 2500 with one or more other computing devices. Communication subsystem 2510 may include wired and/or wireless communication devices compatible with one or more different communication protocols. As non-limiting examples, the communication subsystem may be configured for communication via a wireless telephone network, or a wired or wireless local-area or wide-area network. In some embodiments, the communication subsystem may allow computing system 2500 to send and/or receive messages to and/or from other devices via a network such as the Internet.

Another example provides a static timing analysis computing device, including a logic device, and a storage device holding instructions executable by the logic device to receive an input representative of one or more delays within a signal path in a cross-domain circuit, the cross-domain circuit configured to transfer data between a first domain having a first clock and a second domain having a second clock asynchronous with the first clock, receive an input representative of a static timing analysis constraint to be met by a signal traveling the signal path in the cross-domain circuit, apply the constraint in a static timing analysis of the signal path in the cross-domain circuit, and output a result based upon applying the static timing analysis constraint. The signal path may additionally or alternatively be a first signal path and a control signal path configured to control data sampling at a destination register, and the static timing analysis constraint may additionally or alternatively be based upon one or more delays in a second signal path configured to deliver data to the destination register. The first signal path may additionally or alternatively include a toggle flip-flop circuit that provides a control signal to one or more synchronization flip-flop circuits and the second signal path may additionally or alternatively include a synchronization register that delivers the data to the destination register. Applying the static timing analysis constraint may additionally or alternatively include determining a result of one or more of DataTravel≤i*TDCYC−tSU−tH−DstClkSkew, and (DCR+CQR+DDR)−(DCG+CQG+DDG)≤2*TDCYC−tSU−tH−(DCS−DCD), where DataTravel includes a difference between travel time of a change in data propagating from the first clock to the destination register and travel time from the first clock to a first synchronization flip-flop circuit, DstClkSkew includes a difference in clock insertion delay between the second clock and the first synchronization flip-flop circuit and the second clock and the destination register, i represents a number of synchronization flip-flops through which the control signal passes, DCR includes a clock insertion delay to the synchronization register, CQR includes a clock-to-output delay of all flip-flop circuits in the synchronization register, DDR includes a routing delay from the synchronization register to the destination register, DCG includes a clock insertion delay to the toggle flip-flop circuit, CQG includes a clock-to-output delay of the toggle flip-flop circuit, DDG includes a routing delay from the toggle flip-flop circuit to the first synchronization flip-flop circuit of the one or more synchronization flip-flop circuits, DCD includes a clock insertion delay to flip-flop circuits in the destination register, DCS includes a clock insertion delay to the first synchronization flip-flop circuit, TDCYC includes a cycle time of the second clock, tSU includes a flip-flop setup time of the flip-flop circuits in the destination register, and tH includes a flip-flop hold time of the first synchronization flip-flop circuit. Applying the static timing analysis constraint may additionally or alternatively include determining a result of max(DCR+CQR+DDR)−min(DCG+CQG+DDG)≤2*TDCYC−max(tSU)−max(tH)+min(DCD)−max(DCS), where max( ) includes a maximum function that returns a maximum path in a group passed to the maximum function, and min( ) includes a minimum function that returns a minimum path in a group pass to the minimum function. Applying the static timing analysis constraint may additionally or alternatively include determining a result of one or more of DataTravel≤i*TRCYC−tSU−tH−RClkSkew, and (DCR+CQR+DDR)−(DCG+CQG+DDG)≤2*TRCYC−tSU−tH−(DCS−DCD), where DataTravel includes a difference between travel time of a change in data propagating from the first clock to a capture register and travel time from the first clock to a first synchronization flip-flop circuit of one or more synchronization flip-flop circuits in the cross-domain circuit, RClkSkew includes a difference in clock insertion delay between the second clock and the first synchronization flip-flop circuit and the second clock and the capture register, i represents a number of synchronization flip-flops through which the signal passes, DCR includes a clock insertion delay to a register file, CQR includes a clock-to-output delay of all flip-flop circuits in the register file, DDR includes a routing delay from the register file to the capture register, DCG includes a clock insertion delay to a gray code counter, CQG includes a clock-to-output delay of the gray code counter, DDG includes a routing delay from the gray code counter to the first synchronization flip-flop circuit of the one or more synchronization flip-flop circuits, DCD includes a clock insertion delay to flip-flop circuits in the capture register, DCS includes a clock insertion delay to the first synchronization flip-flop circuit, TRCYC includes a cycle time of the second clock, tSU includes a flip-flop setup time of the flip-flop circuits in the capture register, and tH includes a flip-flop hold time of the first synchronization flip-flop circuit. The signal path may additionally or alternatively be a first gray code bit synchronization path for a first gray code pointer bit for a gray code buffer index, the static timing analysis constraint may additionally or alternatively be based upon one or more delays in a second gray code bit synchronization path for a second gray code pointer bit for the gray code buffer index, each of the first gray code pointer bit and the second gray code pointer bit may additionally or alternatively be generated by a gray code counter comprising a flip-flop circuit for each gray code pointer bit, and an output of the gray code buffer index may additionally or alternatively be provided to a capture register. Applying the static timing analysis constraint may additionally or alternatively include determining a result of one or more of SignalSkewMN≤TWCYC−tSUM−tHN−RCLKSkewNM, SignalSkewMN≤TRCYC−tSUM−tHN−WCLKSkewNM, (DWM+CQM+DM)−(DWN+CQN+DN)≤TWCYC−tSUM−tHN−(DRN−DRM), and (DWM+CQM+DM)−(DWN+CQN+DN)≤TRCYC−tSUM−tHN−(DRN−DRM), where SignalSkewMN includes the difference between sums of clock insertion delays, clock-to-output delays, and routing delays for gray code pointer bits M and N, TWCYC includes a minimum cycle time of a write clock controlling timing of the write pointer gray-code counter, RCLKSkewNM includes a difference between clock insertion delays to synchronizer flip-flop circuits for the write pointer gray-code counter bits M and N, WCLKSkewNM includes a difference between clock insertion delays to synchronizer flip-flop circuits for the read pointer gray-code counter bits M and N, DWM includes a clock insertion delay to the flip-flop circuit for the first gray-code counter bit, CQM includes a clock-to-output delay of the flip-flop circuit for the first gray-code counter bit, DM includes a routing delay from the flip-flop circuit for the first gray-code counter bit to a first synchronization flip-flop for that bit, DWN includes a clock insertion delay to the flip-flop circuit for the second gray-code counter bit, CQN includes a clock-to-output delay of the flip-flop circuit for the second gray code counter bit, DN includes a routing delay from the flip-flop circuit for the second gray-code counter bit to the synchronization flip-flop for that bit, TRCYC includes a minimum cycle time of a read clock controlling timing of the read pointer gray-code counter, tSUM includes a flip-flop setup time of the flip-flop circuit in the synchronization flip-flop of the first bit, tHN includes a flip-flop hold time of the synchronization flip-flop of the second bit, DRN includes a clock insertion delay to the synchronization flip-flop of the second bit, and DRM includes a clock insertion delay to the synchronization flip-flop of the first bit. The cross-domain bridge circuit may additionally or alternatively be an asynchronous FIFO circuit, any the signal path may additionally or alternatively be a round trip synchronization path of a write pointer in the asynchronous FIFO circuit from a write clock input at a write-side address counter to an address subtractor at a read-side of the cross-domain circuit, and from a read clock input at a read-side address counter to an address subtractor at a write-side of the asynchronous FIFO circuit. Applying the static timing analysis constraint may additionally or alternatively include determining a result of one or more of (DCG+CQG+DDG+tSUW)−DCT+(DCA+CQA+DDA+tSUR)−DCS≤TXCYC+3*TΔ, (DCG+CQG+DDG+tSUW)−DCT+(DCA+CQA+DDA+tSUR)−DCS≤J*TCYC, and (DCG+CQG+DDG+tSUW)−DCT+(DCA+CQA+DDA+tSUR)−DCS≤TCYC, where TΔ=|TWCYC−TRCYC|, TXCYC=max(TWCYC,TRCYC), J=K−5 for "K" FIFO levels, DCG includes a clock insertion delay to the write pointer, CQG includes a clock-to-output delay of the write pointer, DDG includes a routing delay from the write pointer to a first synchronization flip-flop circuit in the wclk to rclk synchronization chain, tSUW includes a flip-flop setup time of the first synchronization flip-flop, DCT includes a clock insertion delay to a first synchronization flip-flop circuit in the rclk to wclk synchronization chain, DCA includes a clock insertion delay to the read pointer, CQA includes a clock-to-output delay of the read pointer, DDA includes a routing delay from the read pointer to the first synchronization flip-flop circuit in the rclk to wclk synchronization chain, DCS includes a clock insertion delay to the first synchronization flip-flop circuit in the wclk to rclk synchronization chain, and TCYC includes a minimum cycle time where a cycle time of a read clock is equal to a cycle time of a write clock. Applying the static timing analysis constraint may additionally or alternatively include determining a result of max(DCG+CQG+DDG+tSUW)−min(DCT)+max(DCA+CQA+DDA+tSUR)−min(DCS)≤TCYC, where max( ) includes a maximum function that returns a maximum path in a group passed to the maximum function, and min( ) includes a minimum function that returns a minimum path in a group pass to the minimum function. The static timing analysis constraint may additionally or alternatively be determined based upon measurements of delays that occur during a momentary phase alignment between the first clock and the second clock. Any or all of the above-described examples may be combined in any suitable manner in various implementations.

Another example provides, on a static timing analysis computing device, a method for applying a static timing analysis constraint, the method including receiving an input representative of one or more delays within a signal path in a cross-domain circuit, the cross-domain circuit configured to transfer data between a first domain having a first clock and a second domain having a second clock asynchronous with the first clock, receiving an input representative of a static timing analysis constraint to be met by a signal traveling the signal path in the cross-domain circuit, apply the constraint in a static timing analysis of the signal path in the cross-domain circuit, and outputting a result based upon applying the static timing analysis constraint, the result indicating whether the static timing analysis constraint is met. The signal path may additionally or alternatively be a first signal path and a control signal path configured to control data sampling at a destination register, and the static timing analysis constraint may additionally or alternatively be based upon one or more delays in a second signal path configured to deliver data to the destination register. Applying the static timing analysis constraint may additionally or alternatively include comparing a data travel time to 2 cycle times of the second clock minus a sum of a setup time of flip-flop circuits within the destination register, a hold time of a first synchronization flip-flop circuit in the first signal path, and a difference between a clock insertion delay to the flip-flop circuits within the destination register and a clock insertion delay to the first synchronization flip-flop circuit. The signal path may additionally or alternatively be a first gray code bit synchronization path for a first gray code pointer bit for a gray code buffer index, and the static timing analysis constraint may additionally or alternatively be based upon one or more delays in a second gray code bit synchronization path for a second gray code pointer bit for the gray code buffer index. The cross-domain circuit may additionally or alternatively be an asynchronous FIFO circuit, the signal path may additionally or alternatively be a round trip synchronization path of a write pointer in the asynchronous FIFO circuit from a write clock input at a write-side address counter to an address subtractor at a read-side of the cross-domain circuit, and the constraint may additionally or alternatively be based on a cycle time of the first clock and a cycle time of the second clock. The static timing analysis constraint may additionally or alternatively be determined based upon measurements of delays that occur during a momentary phase alignment between the first clock and the second clock. Any or all of the above-described examples may be combined in any suitable manner in various implementations.

Another example provides a static timing analysis computing device for analyzing an asynchronous FIFO bridge, the computing device including a logic device, and a storage device holding instructions executable by the logic device to receive a first input representative of one or more delays within a first gray code bit synchronization path for a first gray code pointer bit for a gray code buffer index in a cross-domain circuit, the cross-domain circuit configured to transfer data between a first domain having a first clock and a second domain having a second clock asynchronous with the first clock, receive a second input representative of one or more delays within a second gray code bit synchronization path for a second gray code pointer bit for the gray code buffer index in the cross-domain circuit, apply a first static timing analysis constraint derived based on a first skew relationship of a first signal traveling the first gray code bit synchronization path and a second signal traveling the second gray code bit synchronization path under a condition of the first signal and second signal having a same first originating event, receive a third input representative of one or more delays within a round trip synchronization path of a write pointer in the cross-domain circuit, the cross-domain circuit comprising an asynchronous FIFO circuit, receive a fourth input representative of a cycle time for the asynchronous FIFO, the cycle time for the asynchronous FIFO being based on a cycle time of the first clock and a cycle time of the second clock, apply a second static timing analysis constraint derived based on a second skew relationship of a third signal traveling the round trip synchronization path of the write pointer and the cycle time for the asynchronous FIFO, and output a result based upon applying the first and second static timing analysis constraints. The first and second static timing analysis constraints may additionally or alternatively be determined based upon measurements of delays that occur during a momentary phase alignment between the first clock and the second clock. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic device; and
a storage device holding instructions executable by the logic device to
receive an input representative of one or more delays within a signal path in a cross-domain circuit, the cross-domain circuit configured to transfer data between a first domain having a first clock and a second domain having a second clock asynchronous with the first clock;
receive an input representative of a static timing analysis constraint to be met by a signal traveling the signal path in the cross-domain circuit;
apply the statistic timing analysis constraint to be met by the signal traveling the signal path in the cross-domain circuit by determining a result of:

$$\text{DataTravel} \leq i^* T_{RCYC} - t_{SU} - t_H - R\text{ClkSkew, or} \tag{1}$$

$$(DCR+CQR+DDR)-(DCG+CQG+DDG) \leq 2^* T_{RCYC} - t_{SU} - t_H - (DCS-DCD), \tag{2}$$

wherein, in (1) and (2), DataTravel includes a difference between travel time of a change in data propagating from the first clock to a capture register and travel time from the first clock to a first synchronization flip-flop circuit of one or more synchronization flip-flop circuits in the cross-domain circuit, RClkSkew includes a difference in clock insertion delay between the second clock and the first synchronization flip-flop circuit and the second clock and the capture register, i represents a number of synchronization flip-flops through which the signal passes, DCR includes a clock insertion delay to a register file, CQR includes a clock-to-output delay of all flip-flop circuits in the register file, DDR includes a routing delay from the register file to the capture register, DCG includes a clock insertion delay to a gray code counter, CQG includes a clock-to-output delay of the gray code counter, DDG includes a routing delay from the gray code counter to the first synchronization flip-flop circuit of the one or more synchronization flip-flop circuits, DCD includes a clock insertion delay to flip-flop circuits in the capture register, DCS includes a clock insertion delay to the first synchronization flip-flop circuit, $T_{RCYC}$ includes a cycle time of the second clock, $t_{SU}$ includes a flip-flop setup time of the flip-flop circuits in the capture register, and $t_H$ includes a flip-flop hold time of the first synchronization flip-flop circuit; and
output a result based upon applying the static timing analysis constraint.

2. The computing device of claim 1, wherein the signal path is a first signal path and is a control signal path configured to control data sampling at a destination register, and the static timing analysis constraint is further based upon one or more delays in a second signal path configured to deliver data to the destination register.

3. The computing device of claim 1, wherein the signal path is a first gray code bit synchronization path for a first gray code pointer bit for a gray code buffer index, wherein the static timing analysis constraint is based upon one or more delays in a second gray code bit synchronization path for a second gray code pointer bit for the gray code buffer index, wherein each of the first gray code pointer bit and the second gray code pointer bit is generated by the gray code counter, the gray code counter comprising a flip-flop circuit for each gray code pointer bit, and wherein an output of the gray code buffer index is provided to the capture register.

4. The computing device of claim 1, wherein the cross-domain circuit is an asynchronous FIFO circuit, wherein the signal path is a round trip synchronization path of a write pointer in the asynchronous FIFO circuit from a write clock input at a write-side address counter to an address subtractor at a read-side of the cross-domain circuit, and from a read clock input at a read-side address counter to an address subtractor at a write-side of the asynchronous FIFO circuit.

5. The computing device of claim 1, wherein the static timing analysis constraint is further determined based upon measurements of delays that occur during a momentary phase alignment between the first clock and the second clock.

6. The computing device of claim 2, wherein the first signal path includes a toggle flip-flop circuit that provides a control signal to one or more synchronization flip-flop circuits and the second signal path includes a synchronization register that delivers the data to the destination register.

7. The computing device of claim 3, wherein applying the static timing analysis constraint includes determining a result of $$\text{SignalSkew}MN \leq T_{WCYC} - t_{SUM} - t_{HN} - R\text{CLKSkew}NM, \tag{6}$$

$$\text{SignalSkew}MN \leq T_{RCYC} - t_{SUM} - t_{HN} - W\text{CLKSkew}NM, \tag{7}$$

$$(DWM+CQM+DM)-(DWN+CQN+DN) \leq T_{WCYC} - t_{SUM} - t_{HN} - (DRN-DRM), \text{ or} \tag{8}$$

$$(DWM+CQM+DM)-(DWN+CQN+DN) \leq T_{RCYC}- t_{SUM}-t_{HN}-(DRN-DRM), \quad (9)$$

where, in (6), (7), (8), and (9), SignalSkewMN includes the difference between sums of clock insertion delays, clock-to-output delays, and routing delays for gray code pointer bits M and N, $T_{WCYC}$ includes a minimum cycle time of a write clock controlling timing of the write pointer gray-code counter, RCLKSkewNM includes a difference between clock insertion delays to synchronizer flip-flop circuits for the write pointer gray-code counter bits M and N, WCLKSkewNM includes a difference between clock insertion delays to synchronizer flip-flop circuits for the read pointer gray-code counter bits M and N, DWM includes a clock insertion delay to the flip-flop circuit for the first gray-code counter bit, CQM includes a clock-to-output delay of the flip-flop circuit for the first gray-code counter bit, DM includes a routing delay from the flip-flop circuit for the first gray-code counter bit to a first synchronization flip-flop for that bit, DWN includes a clock insertion delay to the flip-flop circuit for the second gray-code counter bit, CQN includes a clock-to-output delay of the flip-flop circuit for the second gray code counter bit, DN includes a routing delay from the flip-flop circuit for the second gray-code counter bit to the synchronization flip-flop for that bit, $T_{RCYC}$ includes a minimum cycle time of a read clock controlling timing of the read pointer gray-code counter, $t_{SUM}$ includes a flip-flop setup time of the flip-flop circuit in the synchronization flip-flop of the first bit, $t_{HN}$ includes a flip-flop hold time of the synchronization flip-flop of the second bit, DRN includes a clock insertion delay to the synchronization flip-flop of the second bit, and DRM includes a clock insertion delay to the synchronization flip-flop of the first bit.

8. The computing device of claim 4, wherein applying the static timing analysis constraint further includes determining a result of $$(DCG+CQG+DDG+t_{SUW})-DCT+(DCA+CQA+DDA+ t_{SUR})-DCS \leq T_{XCYC}+3*T\Delta, \quad (10)$$

$$(DCG+CQG+DDG+t_{SUW})-DCT+(DCA+CQA+DDA+ t_{SUR})-DCS \leq J*T_{CYC}, \text{ or} \quad (11)$$

$$(DCG+CQG+DDG+t_{SUW})-DCT+(DCA+CQA+DDA+ t_{SUR})-DCS \leq T_{CYC}, \quad (12)$$

where, in (10), (11), and (12), $T_\Delta = |T_{WCYC}-T_{RCYC}|$, $T_{XCYC}=\max(T_{WCYC},T_{RCYC})$, J=K−5 for "K" FIFO levels, DCG includes a clock insertion delay to the write pointer, CQG includes a clock-to-output delay of the write pointer, DDG includes a routing delay from the write pointer to a first synchronization flip-flop circuit in the wclk to rclk synchronization chain, $t_{SUW}$ includes a flip-flop setup time of the first synchronization flip-flop, DCT includes a clock insertion delay to a first synchronization flip-flop circuit in the rclk to wclk synchronization chain, DCA includes a clock insertion delay to the read pointer, CQA includes a clock-to-output delay of the read pointer, DDA includes a routing delay from the read pointer to the first synchronization flip-flop circuit in the rclk to wclk synchronization chain, DCS includes a clock insertion delay to the first synchronization flip-flop circuit in the wclk to rclk synchronization chain, and $T_{CYC}$ includes a minimum cycle time where a cycle time of a read clock is equal to a cycle time of a write clock.

9. The computing device of claim 6, wherein applying the static timing analysis constraint further includes determining a result of:

$$\text{DataTravel} \leq i*T_{DCYC}-t_{SU}-t_H-\text{DstClkSkew, or} \quad (3)$$

$$((DCR+CQR+DDR)-(DCG+CQG+DDG) \leq 2*T_{DCYC}- t_{SU}-t_H-(DCS-DCD), \quad (4)$$

where, in (3) and (4), DataTravel includes a difference between travel time of a change in data propagating from the first clock to the destination register and travel time from the first clock to the first synchronization flip-flop circuit of the one or more synchronization flip-flop circuits, DstClkSkew includes a difference in clock insertion delay between the second clock and the first synchronization flip-flop circuit and the second clock and the destination register, DCR includes a clock insertion delay to the synchronization register, CQR includes a clock-to-output delay of all flip-flop circuits in the synchronization register, DDR includes a routing delay from the synchronization register to the destination register, DCG includes a clock insertion delay to the toggle flip-flop circuit, CQG includes a clock-to-output delay of the toggle flip-flop circuit, DDG includes a routing delay from the toggle flip-flop circuit to the first synchronization flip-flop circuit, DCD includes a clock insertion delay to flip-flop circuits in the destination register, $T_{DCYC}$ includes a cycle time of the second clock, and $t_{SU}$ includes a flip-flop setup time of the flip-flop circuits in the destination register.

10. The computing device of claim 8, wherein applying the static timing analysis constraint further includes determining a result of $$\max(DCG+CQG+DDG+t_{SUW})-\min(DCT)+\max (DCA+CQA+DDA+t_{SUR})-\min(DCS) \leq T_{CYC}, \quad (13)$$

where, in (13), DCG includes a clock insertion delay to the write pointer, CQG includes a clock-to-output delay of the write pointer, DDG includes a routing delay from the write pointer to a first synchronization flip-flop circuit in the wclk to rclk synchronization chain, DCS includes a clock insertion delay to the first synchronization flip-flop circuit in the wclk to rclk synchronization chain, max( ) includes a maximum function that returns a maximum path in a group passed to the maximum function, and min( ) includes a minimum function that returns a minimum path in a group pass to the minimum function.

11. The computing device of claim 9, wherein applying the static timing analysis constraint further includes determining a result of $$\max(DCR+CQR+DDR)-\min(DCG+CQG+DDG) \leq 2*T_{DCYC}-\max(t_{SU})-\max(t_H)+\min(DCD)-\max (DCS), \quad (5)$$

where, in (5), DCR includes a clock insertion delay to the synchronization register, CQR includes a clock-to-output delay of all flip-flop circuits in the synchronization register, DDR includes a routing delay from the synchronization register to the destination register, DCG includes a clock insertion delay to the toggle flip-flop circuit, CQG includes a clock-to-output delay of the toggle flip-flop circuit, DDG includes a routing delay from the toggle flip-flop circuit to the first synchronization flip-flop circuit, DCD includes a clock insertion delay to flip-flop circuits in the destination register, $t_{SU}$ includes a flip-flop setup time of the flip-flop circuits in the destination register, max( ) includes a maximum function that returns a maximum path in a group passed to the maximum function, and min( ) includes a minimum function that returns a minimum path in a group pass to the minimum function.

12. On a computing device, a method for applying a static timing analysis constraint, the method comprising:

receiving an input representative of one or more delays within a signal path in a cross-domain circuit, the cross-domain circuit configured to transfer data between a first domain having a first clock and a second domain having a second clock asynchronous with the first clock;

receiving an input representative of a static timing analysis constraint to be met by a signal traveling the signal path in the cross-domain circuit;

applying the constraint in a static timing analysis of the signal path in the cross-domain circuit by comparing a data travel time to 2 cycle times of the second clock minus a sum of a setup time of flip-flop circuits within a register, a hold time of a synchronization flip-flop circuit in the signal path, and a difference between a clock insertion delay to the flip-flop circuits within the register and a clock insertion delay to the synchronization flip-flop circuit; and outputting a result based upon applying the static timing analysis constraint, the result indicating whether the static timing analysis constraint is met.

13. The method of claim 12, wherein the register is a destination register, wherein the signal path is a first signal path and is a control signal path configured to control data sampling at the destination register, and wherein the static timing analysis constraint is based upon one or more delays in a second signal path configured to deliver data to the destination register.

14. The method of claim 12, wherein the signal path is a first gray code bit synchronization path for a first gray code pointer bit for a gray code buffer index, and wherein the static timing analysis constraint is further based upon one or more delays in a second gray code bit synchronization path for a second gray code pointer bit for the gray code buffer index.

15. The method of claim 12, wherein the cross-domain circuit is an asynchronous FIFO circuit, wherein the signal path is a round trip synchronization path of a write pointer in the asynchronous FIFO circuit from a write clock input at a write-side address counter to an address subtractor at a read-side of the cross-domain circuit and wherein the constraint is further based on a cycle time of the first clock and a cycle time of the second clock.

16. The method of claim 12, wherein the static timing analysis constraint is determined based upon measurements of delays that occur during a momentary phase alignment between the first clock and the second clock.

17. A computing device for analyzing an asynchronous FIFO bridge, the computing device comprising:

a logic device; and a storage device holding instructions executable by the logic device to receive a first input representative of one or more delays within a first gray code bit synchronization path for a first gray code pointer bit for a gray code buffer index in a cross-domain circuit, the cross-domain circuit configured to transfer data between a first domain having a first clock and a second domain having a second clock asynchronous with the first clock;

receive a second input representative of one or more delays within a second gray code bit synchronization path for a second gray code pointer bit for the gray code buffer index in the cross-domain circuit;

apply a first static timing analysis constraint derived based on a first skew relationship of a first signal traveling the first gray code bit synchronization path and a second signal traveling the second gray code bit synchronization path under a condition of the first signal and second signal having a same first originating event;

receive a third input representative of one or more delays within a round trip synchronization path of a write pointer in the cross-domain circuit, the cross-domain circuit comprising an asynchronous FIFO circuit;

receive a fourth input representative of a cycle time for the asynchronous FIFO, the cycle time for the asynchronous FIFO being based on a cycle time of the first clock and a cycle time of the second clock;

apply a second static timing analysis constraint derived based on a second skew relationship of a third signal traveling the round trip synchronization path of the write pointer and the cycle time for the asynchronous FIFO, where applying one or more of the first static timing analysis constraint and the second static timing analysis constraint includes determining a result of:

SignalSkew$MN \leq T_{WCYC} - t_{SUM} - t_{HN} -$RCLKSkew$NM$,

SignalSkew$MN \leq T_{RCYC} - t_{SUM} - t_{HN} -$WCLKSkew$NM$, $(DWM+CQM+DM)-(DWN+CQN+DN) \leq T_{WCYC} - t_{SUM} - t_{HN} - (DRN-DRM)$, or $(DWM+CQM+DM)-(DWN+CQN+DN) \leq T_{RCYC} - t_{SUM} - t_{HN} - (DRN-DRM)$, where SignalSkewMN includes the difference between sums of clock insertion delays, clock-to-output delays, and routing delays for gray code pointer bits M and N, $T_{WCYC}$ includes a minimum cycle time of a write clock controlling timing of the write pointer gray-code counter, RCLKSkewNM includes a difference between clock insertion delays to synchronizer flip-flop circuits for the write pointer gray-code counter bits M and N, WCLKSkewNM includes a difference between clock insertion delays to synchronizer flip-flop circuits for the read pointer gray-code counter bits M and N, DWM includes a clock insertion delay to the flip-flop circuit for the first gray-code counter bit, CQM includes a clock-to-output delay of the flip-flop circuit for the first gray-code counter bit, DM includes a routing delay from the flip-flop circuit for the first gray-code counter bit to a first synchronization flip-flop for that bit, DWN includes a clock insertion delay to the flip-flop circuit for the second gray-code counter bit, CQN includes a clock-to-output delay of the flip-flop circuit for the second gray code counter bit, DN includes a routing delay from the flip-flop circuit for the second gray-code counter bit to the synchronization flip-flop for that bit, $T_{RCYC}$ includes a minimum cycle time of a read clock controlling timing of the read pointer gray-code counter, $t_{SUM}$ includes a flip-flop setup time of the flip-flop circuit in the synchronization flip-flop of the first bit, $t_{HN}$ includes a flip-flop hold time of the synchronization flip-flop of the second bit, DRN includes a clock insertion delay to the synchronization flip-flop of the second bit, and DRM includes a clock insertion delay to the synchronization flip-flop of the first bit; and output a result based upon applying the first and second static timing analysis constraints.

18. The computing device of claim 17, wherein the first and second static timing analysis constraints are determined based upon measurements of delays that occur during a momentary phase alignment between the first clock and the second clock.

* * * * *